Aug. 22, 1939.  E. G. BAILEY  2,170,342
VAPOR GENERATOR
Original Filed Dec. 18, 1935  16 Sheets-Sheet 2

INVENTOR.
Ervin G. Bailey
BY
ATTORNEY.

Aug. 22, 1939.  E. G. BAILEY  2,170,342
VAPOR GENERATOR
Original Filed Dec. 18, 1935   16 Sheets-Sheet 3
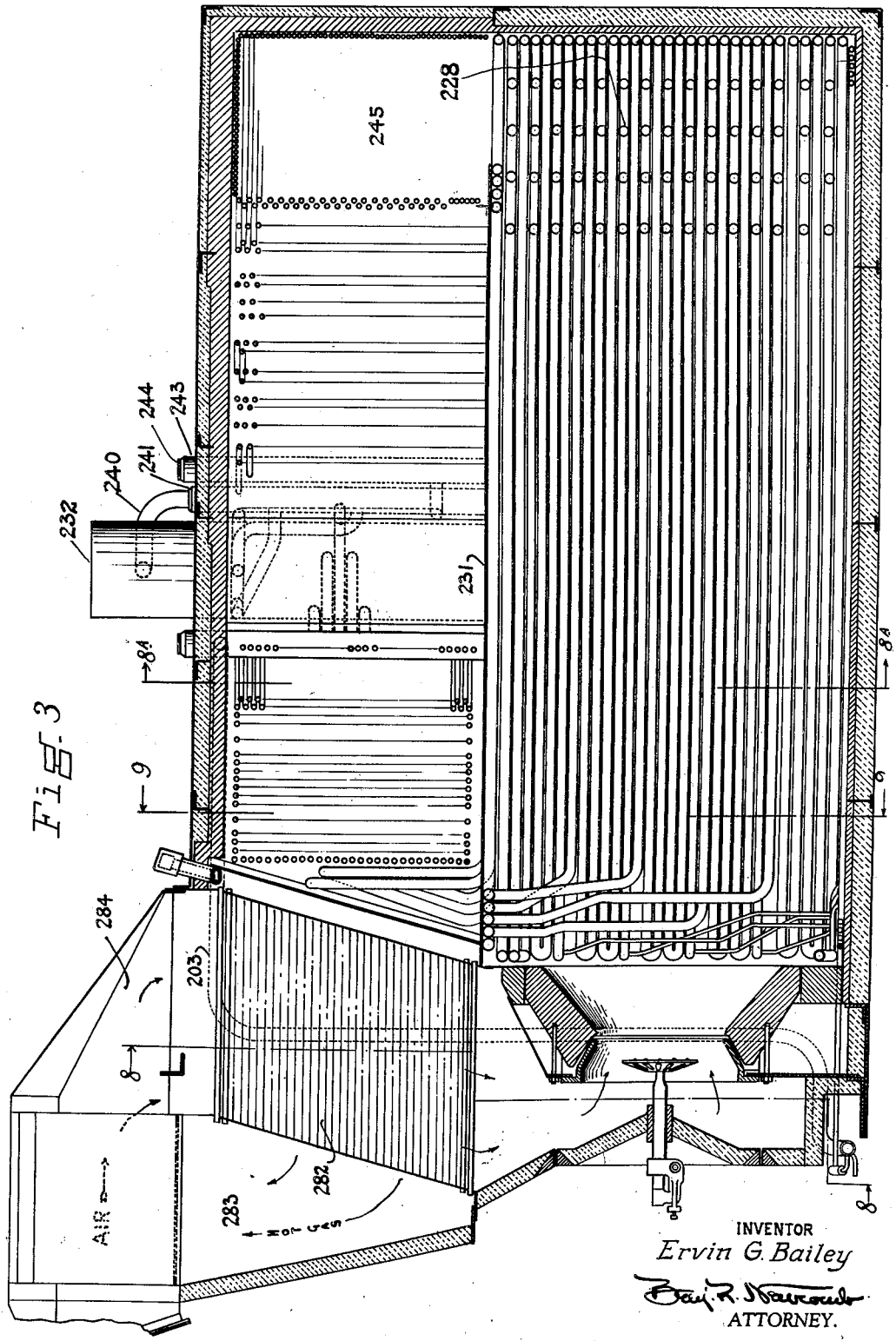
INVENTOR
Ervin G. Bailey
ATTORNEY.

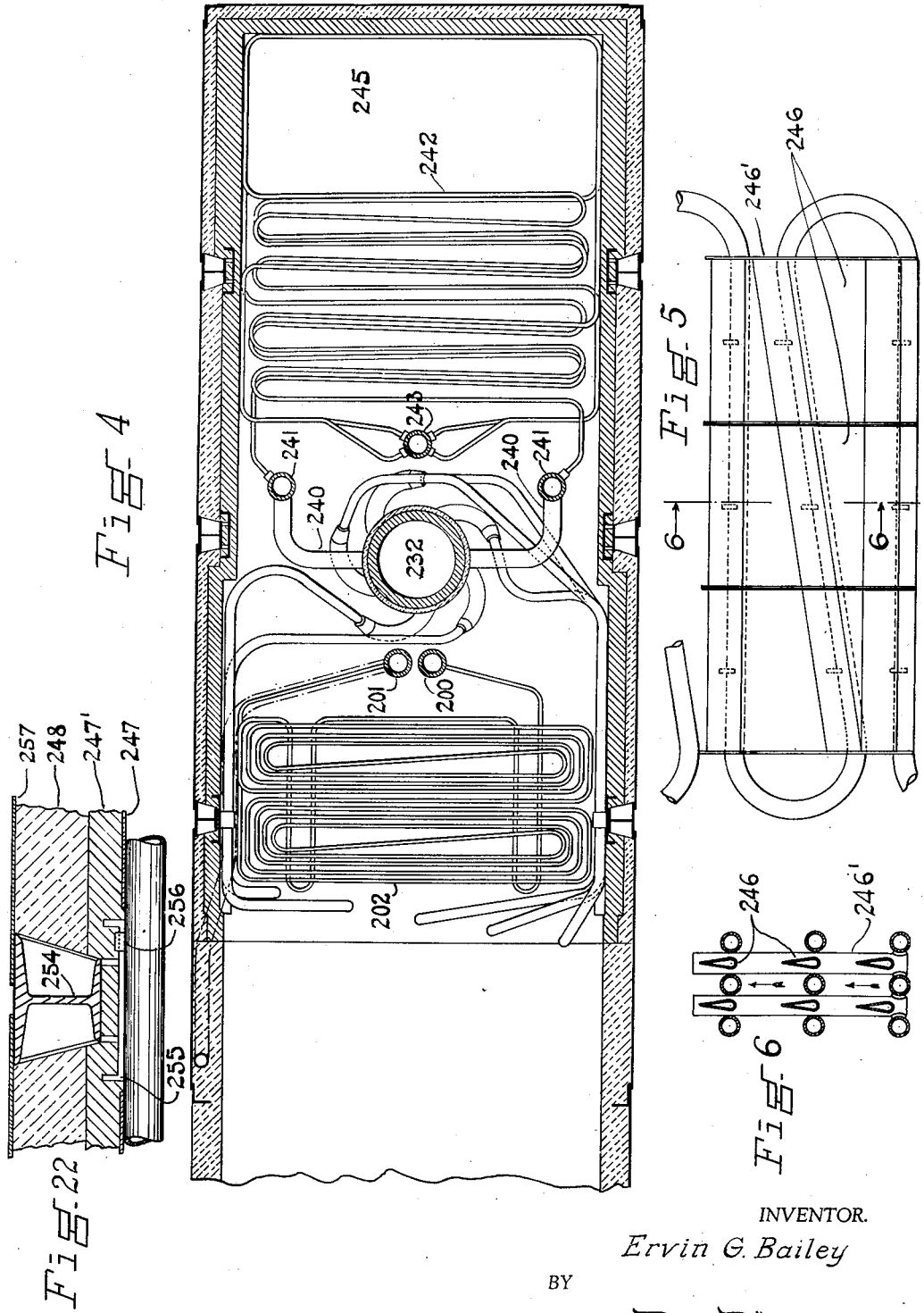

Aug. 22, 1939.　　　　E. G. BAILEY　　　　2,170,342
VAPOR GENERATOR
Original Filed Dec. 18, 1935　　16 Sheets-Sheet 5
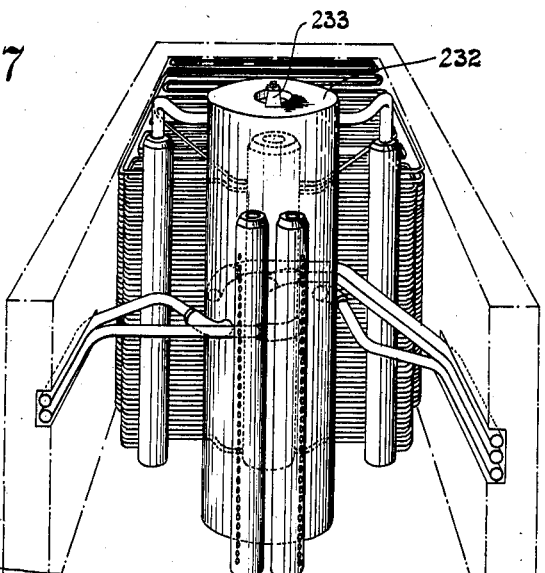
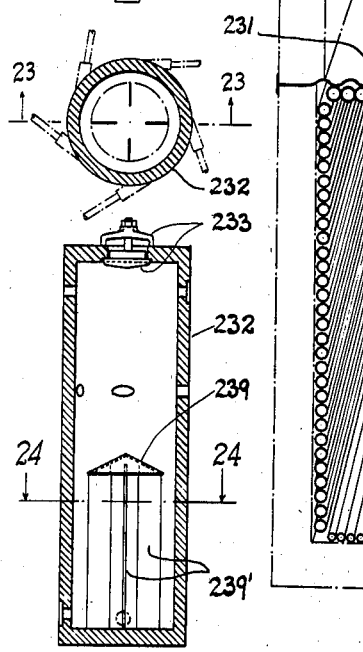
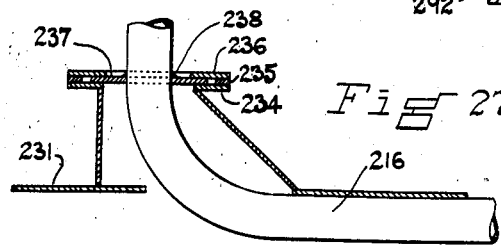
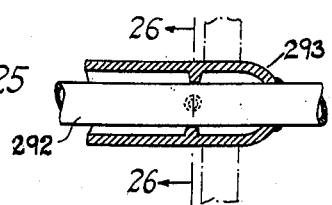
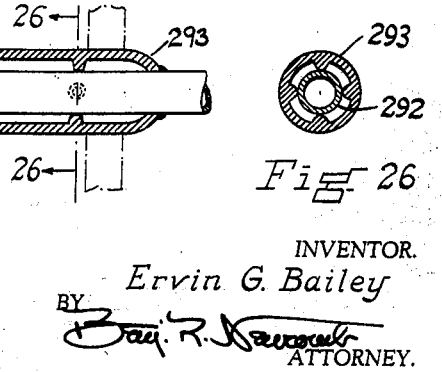
INVENTOR.
Ervin G. Bailey
BY
ATTORNEY.

Aug. 22, 1939.   E. G. BAILEY   2,170,342
VAPOR GENERATOR
Original Filed Dec. 18, 1935   16 Sheets-Sheet 6
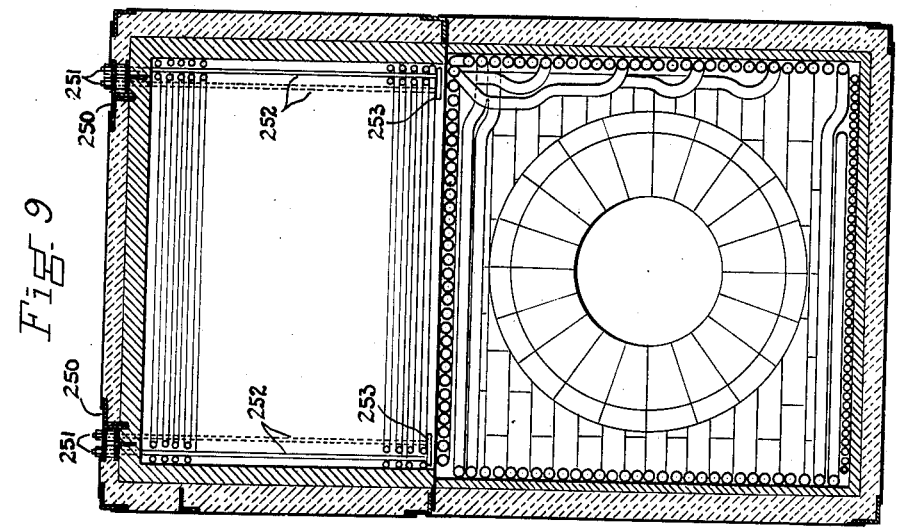
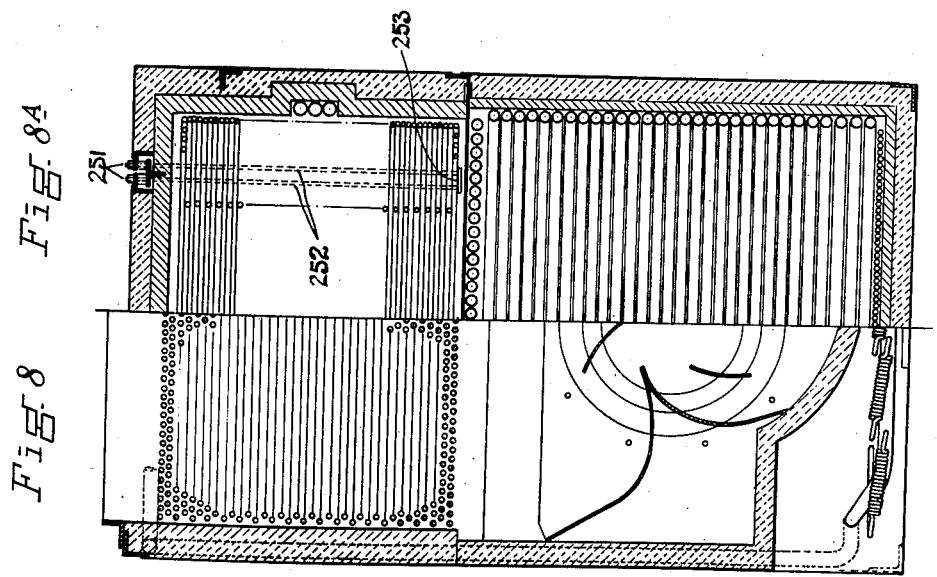
INVENTOR.
Ervin G. Bailey
BY
ATTORNEY.

Aug. 22, 1939. E. G. BAILEY 2,170,342
VAPOR GENERATOR
Original Filed Dec. 18, 1935  16 Sheets-Sheet 7
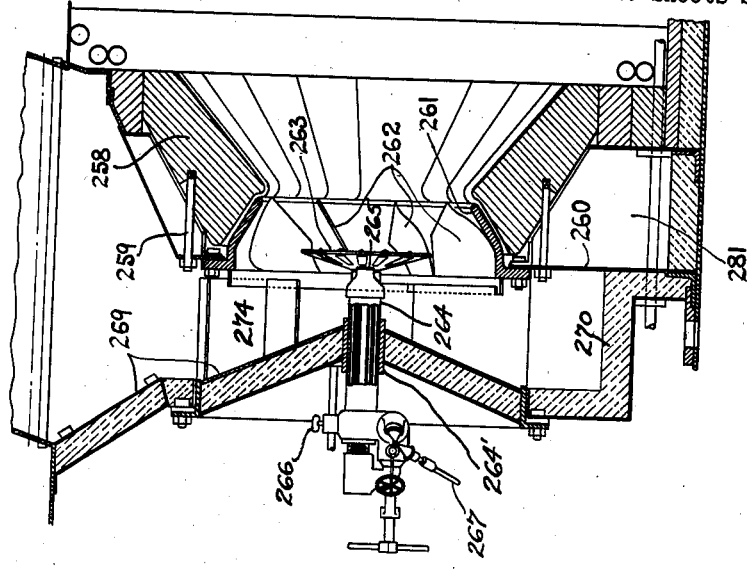
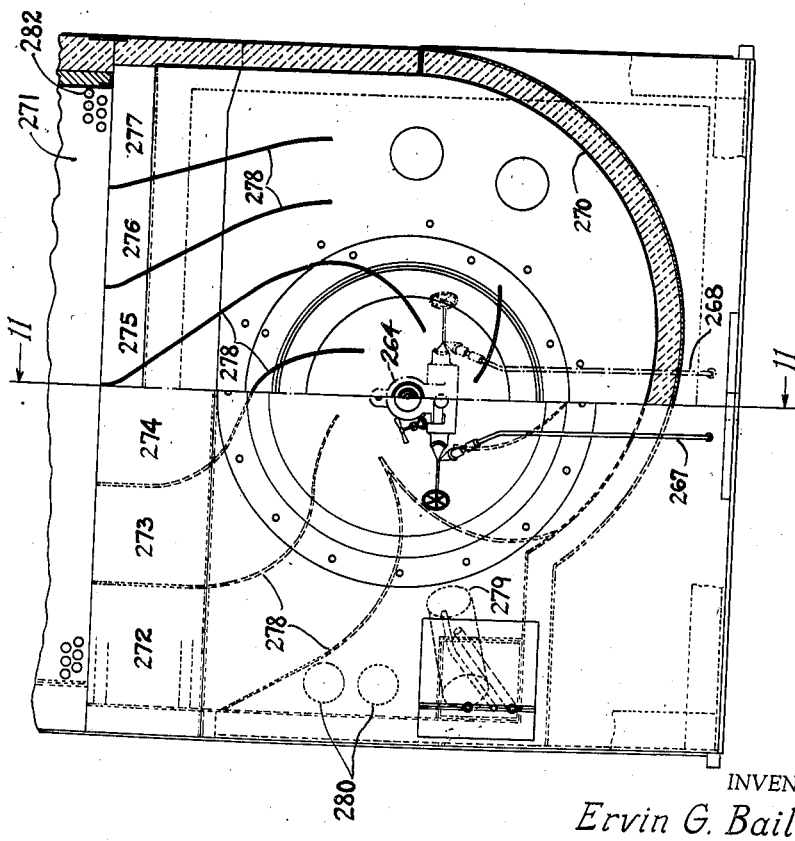
INVENTOR.
Ervin G. Bailey
BY
ATTORNEY.

Aug. 22, 1939.                E. G. BAILEY                2,170,342
                            VAPOR GENERATOR
                   Original Filed Dec. 18, 1935    16 Sheets-Sheet 8
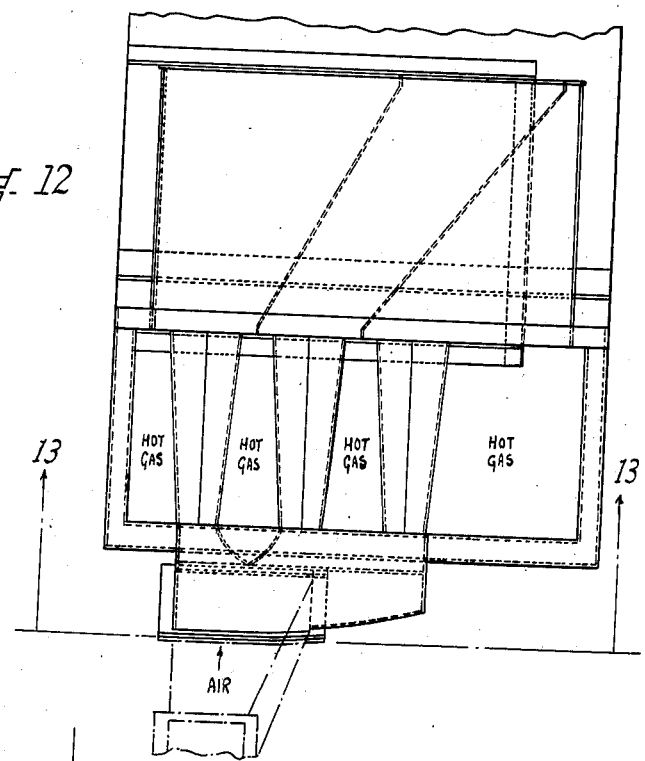
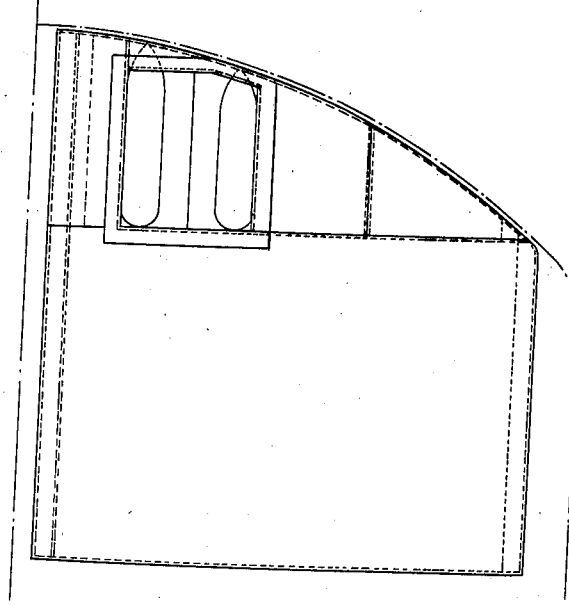
INVENTOR.
Ervin G. Bailey
BY
ATTORNEY.

Aug. 22, 1939.  E. G. BAILEY  2,170,342
VAPOR GENERATOR
Original Filed Dec. 18, 1935   16 Sheets-Sheet 9

INVENTOR.
Ervin G. Bailey
BY
ATTORNEY.

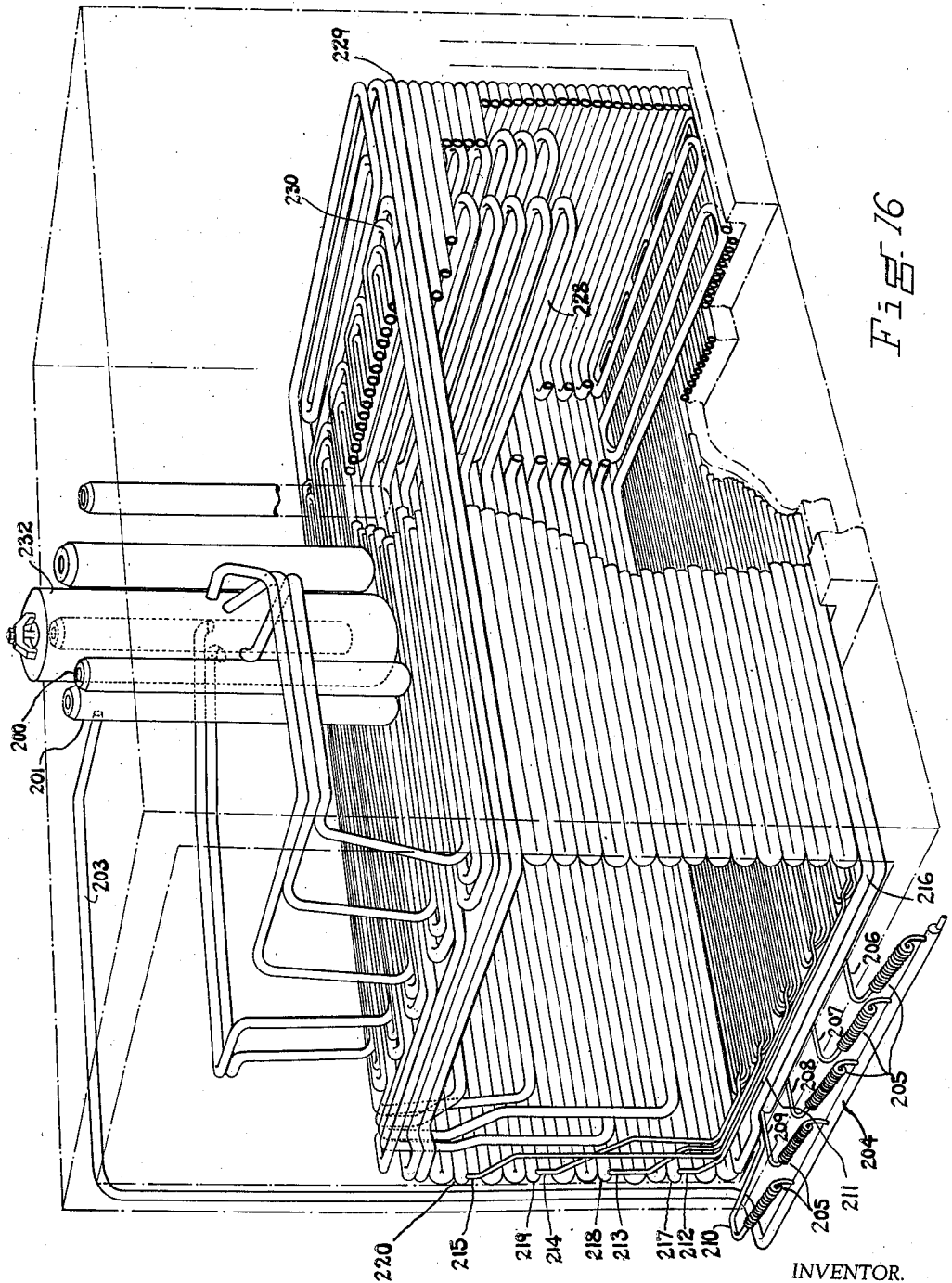

Aug. 22, 1939.　　　　E. G. BAILEY　　　　2,170,342
VAPOR GENERATOR
Original Filed Dec. 18, 1935　　16 Sheets-Sheet 11
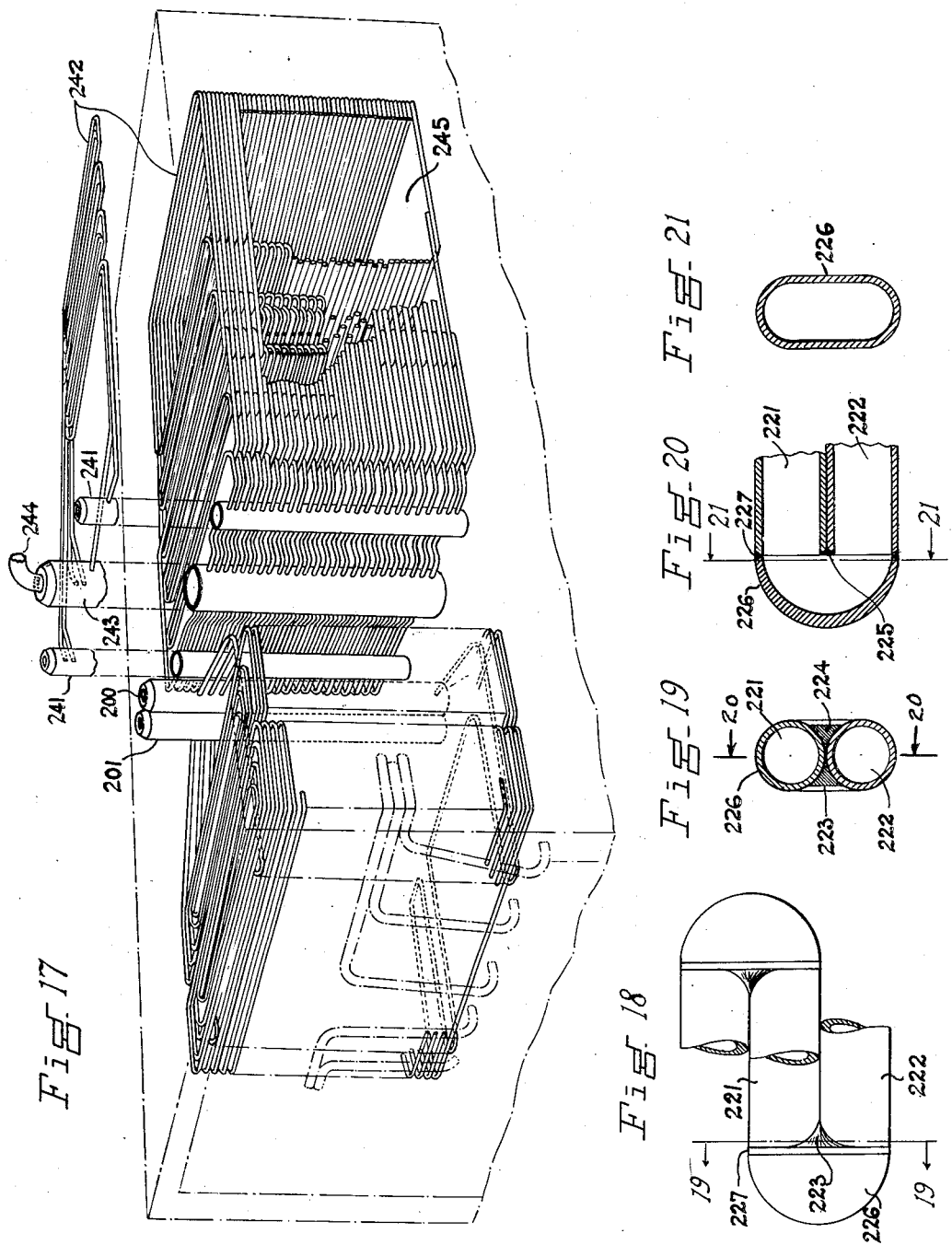
INVENTOR.
Ervin G. Bailey
BY
ATTORNEY.

Wall Tube Portions

Wall and Transverse Tube Portions

Floor Tube Portions

Roof Tube Portions

INVENTOR.
Ervin G. Bailey
BY
ATTORNEY.

Aug. 22, 1939.  E. G. BAILEY  2,170,342
VAPOR GENERATOR
Original Filed Dec. 18, 1935   16 Sheets-Sheet 13

INVENTOR.
Ervin G. Bailey
BY
ATTORNEY.

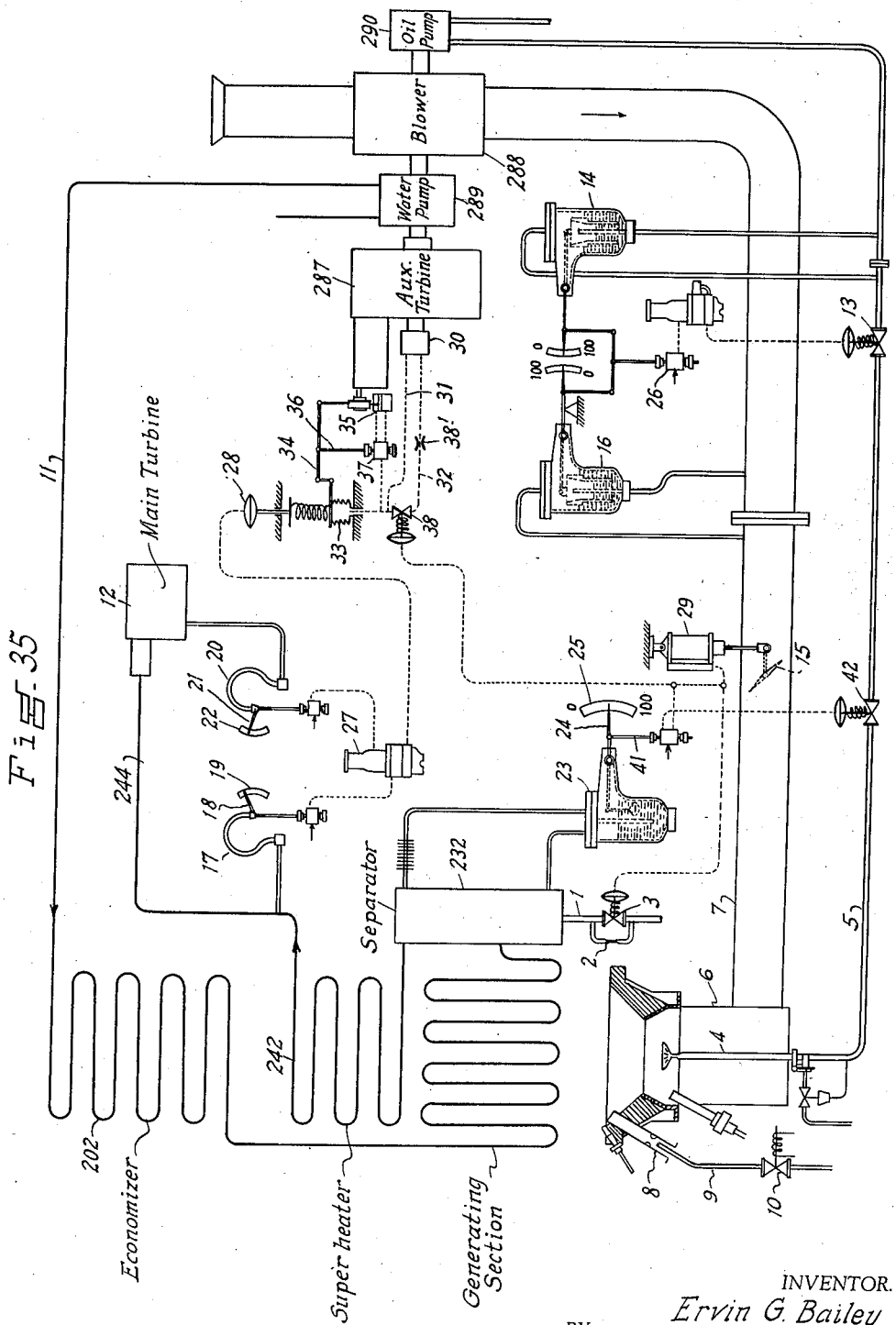

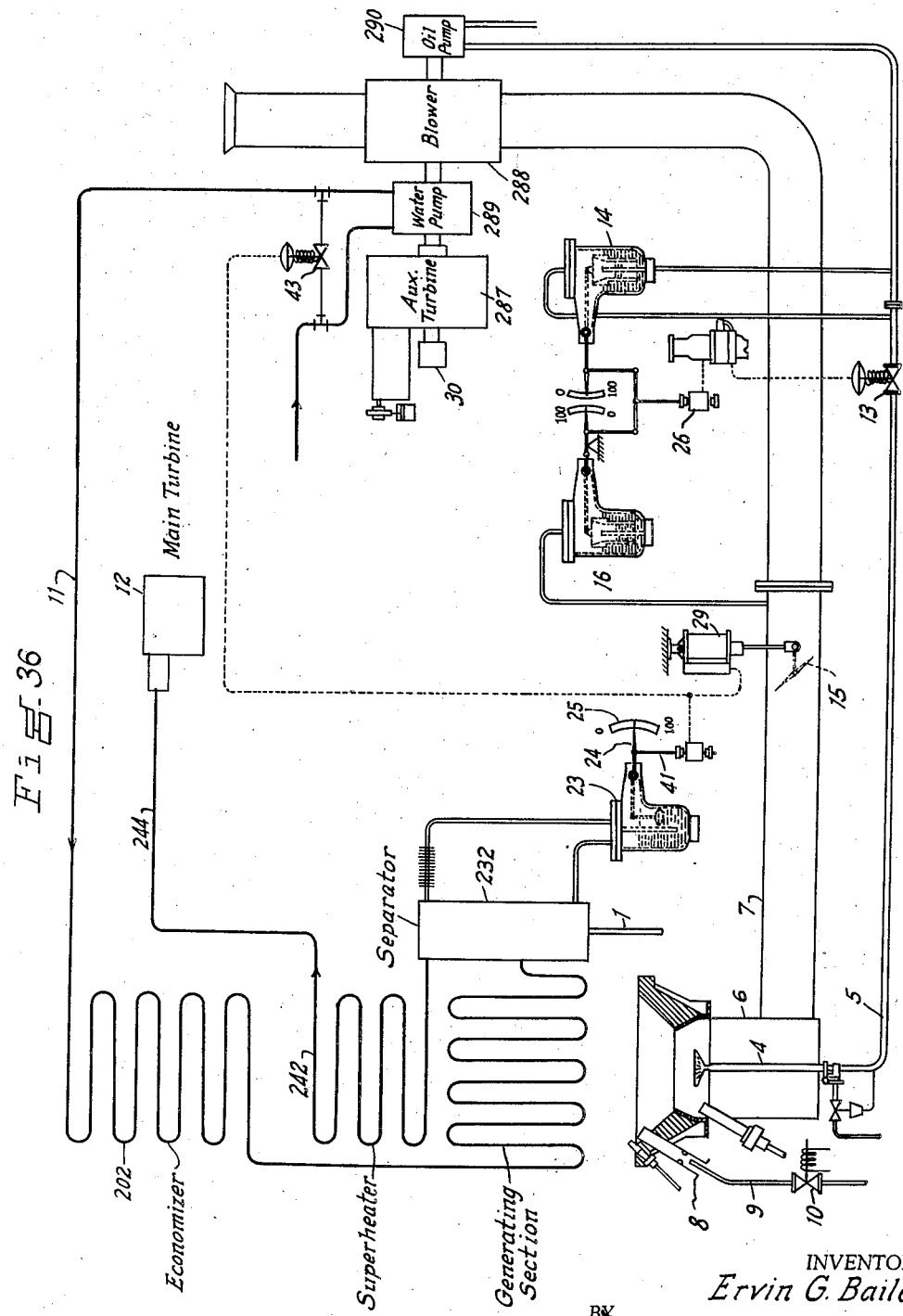

Aug. 22, 1939.   E. G. BAILEY   2,170,342
VAPOR GENERATOR
Original Filed Dec. 18, 1935   16 Sheets—Sheet 16
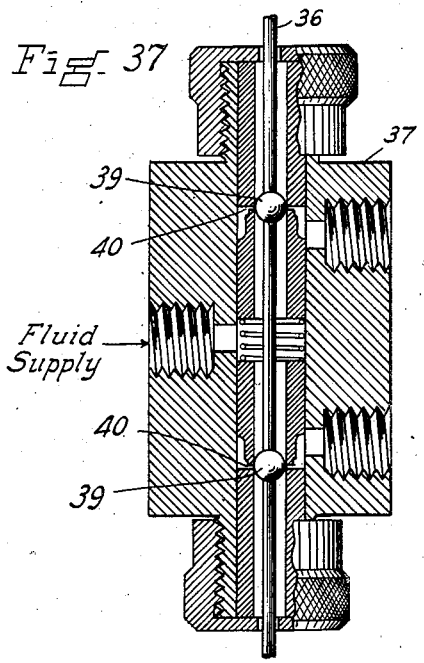
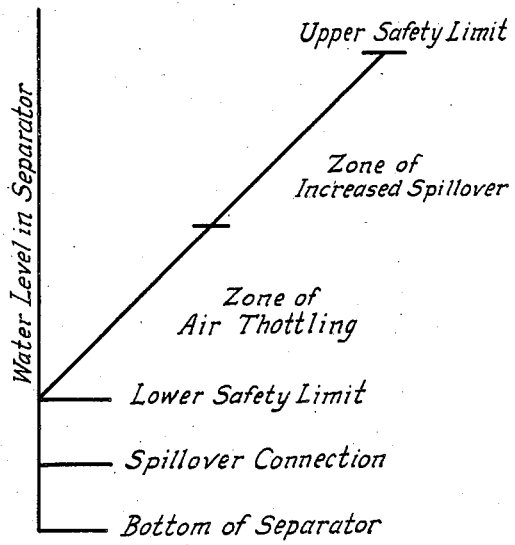
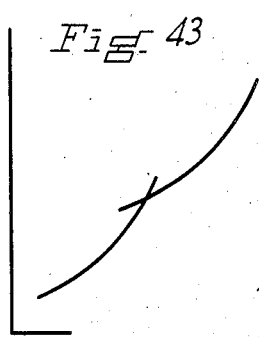
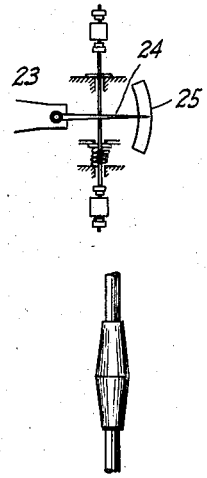
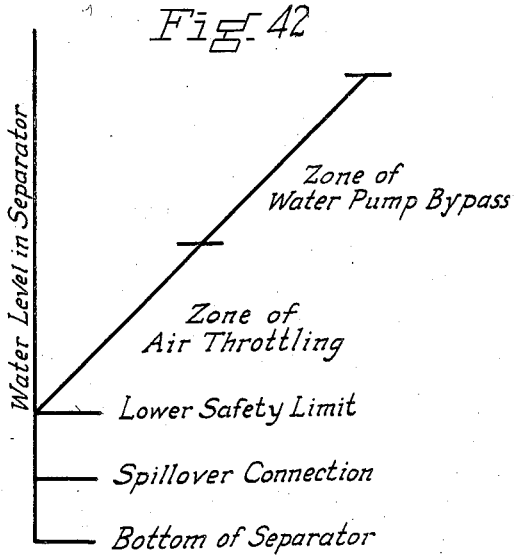
INVENTOR.
Ervin G. Bailey
BY
ATTORNEY.

Patented Aug. 22, 1939

2,170,342

UNITED STATES PATENT OFFICE 2,170,342

VAPOR GENERATOR

Ervin G. Bailey, Easton, Pa., assignor to The Babcock & Wilcox Company, Newark, N. J., a corporation of New Jersey Application December 18, 1935, Serial No. 55,020
Renewed December 9, 1938

19 Claims. (Cl. 122—448)

This invention is a vapor pressure power generator of the drumless forced flow type distinguished, however, by the fact that it is suitable for service where load conditions are of wide range over a short time interval as, for instance, is characterisitic in the mobile service to which power plants are subjected in locomotive and marine applications, and for which great flexibility is a requisite.

Heretofore, engineering development has failed to provide any practicable vapor pressure power plant of high efficiency, adapted, in principle and construction, for a large range of sizes, and capable of meeting the same operating conditions of mobile service, but requiring more power than small automobiles, while still retaining the desirable light weight and small dimension characteristics necessary for competition with internal combustion engines requiring special high priced fuels.

Present day accepted, or standard, vapor generating equipment leaves the problem of a light weight, efficient and reliable vapor generator unsolved in that such modern equipment depends upon large bulk of metal and refractory mass, with great liquid storage, thus rendering it unsuitable for quick change of vapor output volume by reason of the capacity for heat storage inherent in the bulk of solid and liquid masses, and which masses further render such equipment unsuitable due to enormous weight and lack of compactness.

For quick changes of vapor capacity required for stops, starts and alteration of speed or, in other words, to meet the requirement of flexibility, heat storage in the generator must always be at a minimum so that feed of fuel and working liquid may be synchronized with vapor output, and standby and upkeep charges kept at a minimum. In addition to reduction of heat storage to as near zero as possible, flexibility, in a unit of this character, also demands automatic maintenance of proportioning of elements of combustion, heat liberated and absorbed, to working liquid fed, with maintained balance of working liquid feed to rate of delivery or use of vapor generated; such regulation would be impossible without low enough heat storage, and without suitable controls.

In order to have high efficiency in utilization of power from vapor pressure, high vapor pressure is essential; for such high pressures metal enclosures of lightest weight are required and must be made of steel tubes of the smallest practicable diameters, and there must be the least possible use of large diameter headers and drums, those which are used must be of the smallest possible diameter. Such metal enclosure limitations preclude the use of natural circulation of the liquid with conversion of liquid to vapor and therefore dictate some other means of avoiding overheating of metal used to transfer heat of the fuel to the liquid being vaporized and to the vapor being superheated.

High efficiency of vapor generation from fuel heat requires not only that combustion be completed within the furnace space, and that the least possible excess air be present at all loads from zero to maximum, but, also, that the heating surface shall be properly disposed with reference to the furnace and the products of combustion to promote heat absorption to the greatest degree through heating surface exposed within the furnace area and beyond it. This requirement for least weight thus imposes a need for high rates of heat absorption per square foot of heating surface in order that the high degree of absorption of heat for high efficiency is attained with a minimum of surface area.

For the greatest compactness, the furnace must be as small as possible, and the shape of it must be flat sided. Smallest possible furnace size requires the highest possible heat liberation rate from combustion of fuel, B. t. u./hr./cu. ft., and for highest efficiency this must be accomplished with the least possible excess air and no unburned fuel. Flat furnace sides or boundaries, associated with the requirement of a minimum refractory use require that "small bore" tubes be arranged side by side in contact to provide the necessary flat walls with substantially continuous metal surface, for the furnace and other hot gas zones, in addition to arrangement for other requirements.

The present invention, therefore, has as one object, a drumless forced flow vapor pressure generator wherein the metal and refractory masses, as well as the liquid content, are at a minimum, in combination with a wide range heat source, and arrangements of heat transfer surface such that time lag in transmutation of raw fuel energy to heat of delivered vapor is a matter of seconds, and with a large fraction of fuel energy rendered available.

Additionally, the invention embodies apparatus and methods of operation such that the capacity for the small weight and space occupied adapts the equipment for application where dimensions and weight considerations have previously dictated use of the internal combustion engine.

Furthermore, the invention is a vapor generator of small size per unit of capacity, thus providing a generator which, regardless of size, is capable of almost instantaneous load swing from maximum to minimum, and vice versa, while maintaining a high degree of overall efficiency rendered possible by the combination of a multiplicity of long small bore fluid flow passages connected in parallel, the generating sections of which are constantly protectively wet, and with heat absorbing surface disposed and arranged for operation in connection with the path of the hot gases of combustion from a wide range heat source, such that there is insured low thermal resistance from heat source to working fluid, thereby providing a high heat transfer rate; it also being an object to maintain an especially low thermal transfer resistance on the inside of the passage thereby preventing overheating of the tube metal.

The aforesaid heat absorbing surface is arranged, in relation to the furnace, and the passage of the products of combustion, so that entering liquid is received at the cooler end of the gas passage and from there enters the several small bore passages through fluid flow restriction means for each passage equalizing the division of liquid between them, such equalizing means being a flow resistance greater than that of the particular passage it serves.

These tube passages, arranged to form furnace walls, are subject to the heat of the furnace and comprise floor, roof, end, and side walls. The assembly is formed of continuous substantially contacting tube lengths required to be sealed on the exterior side only by a gas tight casing material and a substance of low thermal conductivity and light weight, refractoriness not being essential. Thus the weight of the assembly and space occupied are kept at a medium; and the heat storage is confined to the thin metal walls of the small bore tubes forming the heat absorbing surface, and to the very small quantity of fluid contained therein, whereby such heat storage is consequently instantaneously available for utilization.

Another feature of the invention is the arrangement of the continuous long small bore tubes so that they not only form flat walls of at least five sides of the furnace, but, also, so that certain portions of their length cross the stream of hot gaseous products of combustion to promote heat transfer, without interruption in the long lengths such as result from jointed connections, and beyond the furnace they provide for a greater fraction of the lengths to be exposed to transverse flow of gases and a smaller fraction to form the wall.

A still further feature of the tube arrangement resides in establishing a suitable direction of flow of the working medium, as to levels, in those portions of the lengths, in wall sections or elsewhere, where vapor is being generated, or where vapor and liquid may be flowing together, so that the flow is at one level or always upward to a higher level, but never to a lower level, thereby preventing formation of vapor pockets at high points at lower rates of fluid flow, such vapor pockets being recognized as sources of danger from overheating of tubes at such locations and resulting in damage to the generator, and probable interruption to service of the same, with increase in cost of maintaining the generator in serviceable condition.

Arising from the necessity for a multiplicity of tubes connected in parallel and the smallness of bore for large vapor capacity, so large, in fact, as to require more than one tube of the desired small bore, is the shaping, by bending, of the tubes so that each one of the tubes may be positioned to receive the same amount of heat from the hot gases by radiation and convection, notwithstanding variations in intensity of the heat source along the path of flow from burner to gas exit, consistent with equalization of feed of liquid to the several tubes to insure equal generating capacity in each and to equalize the condition of the fluid delivered from each, while also providing equalization of condition of the several parts of the total fluid from the multiple tubes even if the liquid supplied to each is not the same, such being accomplished by suitable change in position of the tubes or a change in length.

Further, invention resides in the means for insuring synchronization of total heat liberated to total liquid fed, and equalization of the latter to total vapor delivered, continuously and automatically, by controls and auxiliaries cooperating with the other features enumerated.

Also, a feature of the invention is in preventing overheating of tubes when vapor is being generated, this feature residing in the arrangement of tubes and in the cooperation of the auxiliaries and control means to insure that such vapor generating parts of the lengths of the tubes are maintained wet inside, while promoting vaporization to as near complete as practicable, consistent with adequate terminal wetness.

A further feature is in the superheating of the vapor produced, by a minimum of tube surface without overheating the tubes, such being accomplished by removal of unvaporized liquid before the fluid enters the superheater, and by arrangement of the superheater tubes with reference to other tubes to insure that radiant heat of the furnace shall be screened therefrom while gases approaching the superheater are hot enough, but not too hot, and are no more than sufficient to provide the maximum vapor temperature desired when most efficiently swept by the hot gases.

An additional feature is in a metallically integral welded connection of ends of high pressure tubes where straight tube lengths are in contact to form a flat furnace wall and reverse the flow in alternate tubes when connected ends form a wall end.

A feature of the invention is in the bending and arrangement of the tubes extending horizontally across the stream of hot gases, in one part of their length, and forming a wall in another part, whereby the upper tiers are supported by lower ones in gas zones of different temperature, and arranged suitably different for vapor generating, superheating and economizer surfaces.

Additionally the invention has as a feature the burner units and supply of elements of combustion to insure wide range, short flame, and high volume combustion rate.

Still another feature is the superheater arrangement which prevents damage by overheating while starting the vapor generator, during the period after combustion begins but before vapor flow through the generator is established, while maintaining at a minimum the time lag in the delivery of superheated vapor, in combination with the features of the control system.

The invention embodying all of these features, and others, has for its general object, the successful fulfillment of all the conditions that must be met as to high efficiency, high flexibility, low weight, and small space occupied for motive power units capable of competing with internal combustion engines in sizes larger than those for small automobiles. No vapor generator known thus far has been able to fulfill these conditions, whereas the vapor generator of the present invention does fulfill them, there already being in operation one generator built according to the present invention and which has been and is now being subjected to long and severe tests, and which has a capacity of 22,000 pounds of steam per hour, weighs 22,000 pounds, and occupies a space 8' 9" high x 4' 8" wide x 20' 0" long.

In the accompanying drawings illustrative of the invention—

Fig. 3 is a sectional side elevation of the generator shown in Fig. 2.

Fig. 4 is a horizontal sectional plan view on the line 4—4 of Fig. 2.

Fig. 5 is a fragmentary top plan view of the arrangement and support of the elements shown in Fig. 6.

Fig. 6 is an enlarged detail showing stream lined bodies between tubes in the path of the flow of the gases of combustion on line 6—6 of Fig. 5.

Fig. 7 is a sectional view on the plane 7—7 of Fig. 2, in perspective, showing the arrangement of some of the heat absorbing surface.

Fig. 8 is a vertical sectional view on the plane of line 8—8 of Fig. 3.

Fig. 8A is a similar view on the plane of line 8A—8A of Fig. 3.

Fig. 9 is a view similar to Fig. 8 on the plane of line 9—9 of Fig. 3.

Fig. 10 is an end view, partly in section of the burner and its mounting.

Fig. 11 is a sectional side elevation on the plane of line 11—11 of Fig. 10.

Fig. 12 is a plan view of the air heater assembly.

Fig. 13 is a sectional view on the plane of line 13—13 of Fig. 12, which line has also been applied to Fig. 2 in order to more clearly designate the structure.

Fig. 16 is a perspective view, partly broken away, and with the casing removed, to show the arrangement of tubes providing the furnace wall and the location of tube portions across the gas stream.

Fig. 17 is a perspective view, partly broken away, and with the casing removed, to show the arrangement of economizer and superheater, and it is to be noted that this view may be superimposed upon that of Fig. 16 to afford a complete assembly of the heat absorbing surface and furnace.

Fig. 18 is a fragmentary view showing the manner in which straight conduit or tube lengths comprising the flow passage may be assembled by return bends of zero radius to form a flat solid furnace wall requiring no refractory facing.

Fig. 19 is a sectional view on the plane of line 19—19 of Fig. 18.

Fig. 20 is a sectional view on the plane of the line 20—20 of Fig. 19.

Fig. 21 is an end view of the cap for forming the zero radius inter-tube connection or return bend.

Fig. 22 is a detail side elevation, partly in section, of the manner of supporting the tubes of a flat wall by external structural members where they lie adjacent the furnace enclosure.

Fig. 23 is a vertical sectional view through the liquid collecting separator.

Fig. 24 is a sectional view on the line 24—24 of Fig. 23.

Fig. 25 is a detail side elevation, partly in section, of one method of protecting water level connections and the like where such enter the separator through the path of the hot gases.

Fig. 26 is a sectional view on the line 26—26 of Fig. 25.

Fig. 27 is a sectional side elevation of the sealing means for tubes passing through the division plate.

Figure 32:
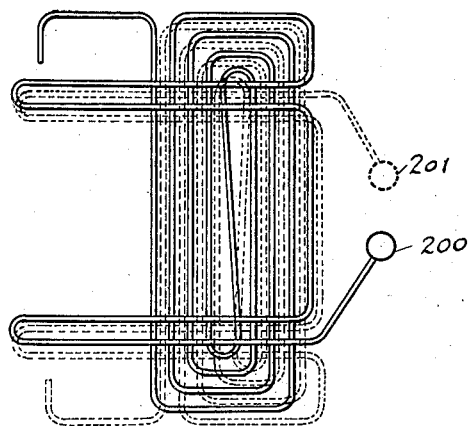

Fig. 32 shows a tube bent to form a part of the economizer between an inlet and an outlet header, said header being vertical, these sections of the tube forming, respectively, a horizontal flat coil transverse to the gas flow, a pair of cross loops to support a flat coil above it, and a section of wall of the gas passage on opposite sides; two sets of such tubes alternately bent in opposite directions and all supported from the bottom comprise the economizer.

Figure 33:
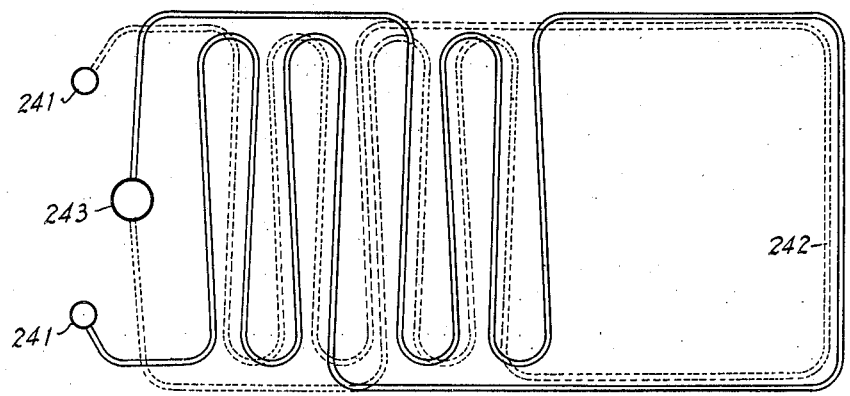

Fig. 33 shows a tube bent to form a part of the superheater between the vertical inlet and vertical outlet headers, two sections of the tube forming, respectively, a horizontal flat coil transverse of the gas flow stream and sections of the walls of the gas passage on opposite sides and the end above the end of the furnace. Two sets of such tubes alternately bent in opposite directions starting from two inlet headers and ending in one outlet header alternate at successive levels complete the side walls and the end wall, and are bent so that return bends at alternate levels have offset centers whereby one coil supports another above it at the return bend crossings and the whole bank is supported on the bottom.

Figure 34:
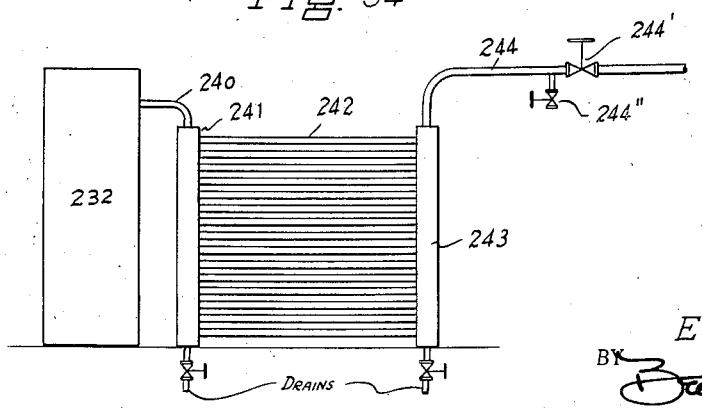

Fig. 34 is a diagrammatic representation of the horizontal flat superheater coils between vertical inlet and vertical outlet headers, with saturated vapor connection from the separator-collector, and superheated vapor delivery connections to the throttle valve that controls the flow of vapor to use and to a bleeder valve placed in advance and used in starting prior to opening the throttle.

Fig. 35 diagrammatically illustrates the drumless forced flow vapor generator of the present invention adapted to and combined with the requisite auxiliary and control apparatus for the functioning thereof, as the generator of steam for a steam prime mover of a transportation motive power plant.

Fig. 36 diagrammatically illustrates the drumless forced flow vapor generator of the present invention, with a somewhat d'fferent and alternate arrangement of control apparatus than that of Fig. 35.

Fig. 37 is a sectional elevation of a pilot valve.

Figs. 38, 39 and 40 are valve elements of pilot valves to an enlarged scale.

Figs. 41, 42 and 43 are graphs explanatory of the operation of the control apparatus in relation to the functioning of the generator.

Fig. 44 is a detail of a part of the control apparatus of Figs. 35 and 36, in modified form.

In detail—

Figure 1:
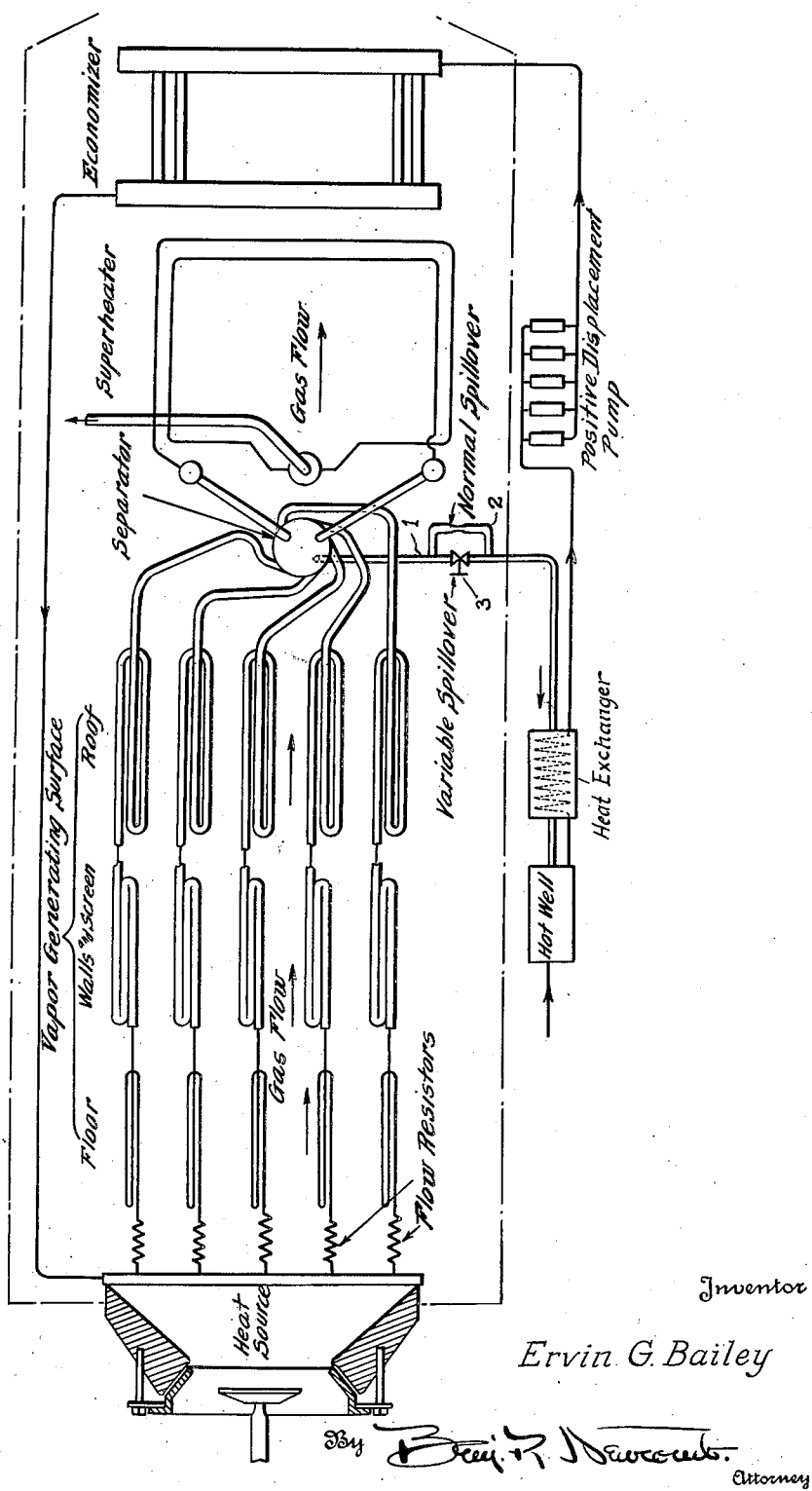
Fig. 1 is a diagrammatic view of the arrangement of the heat absorbing surface of a vapor generator according to the present invention and indicative of the path of gas flow and flow of working fluid.

The forced flow vapor generator constituting this invention is diagrammatically illustrated in Fig. 1 to indicate gas flow, working fluid flow and sequence of contact with sections of the heat absorbing surface as contained within the enclosure represented by the dot and dash line indicative of the casing walls.

The flow path for the liquid and its vapor is comprised of several long small bore tubes 206, 207, 208, 209, 210 connected in parallel, five being here shown, interrupted by an enlargement at the end of the vapor generating section which acts as a separator or collector 232 to divide vapor and liquid, the saturated vapor passing therefrom without liquid to a superheater 242, a portion of the entering liquid being carried through the tubes to the separator 232 for the purpose of tube metal wetness and preventing solid deposits. This unvaporized liquid is finally diverted out of the flow path at the separator 232 and withdrawn under regulated conditions as will be hereinafter set forth.

The parts of the generator are arranged on two levels within vertical walls common to both. The lower level is occupied by the flat sided furnace, with horizontal bare tube walls on five sides, the sixth having the burner space with refractory around it; at the rear end of the furnace there is a bank of horizontal tubes 228 disposed across it. The hot gases of combustion pass from the lower to the upper level at the rear end 245 and return through a gas passage over the furnace roof to an air heater 282 above the burner before their exit. The upper level at the hot gas end is occupied by the superheater 242 which is screened from the radiant heat of the furnace partly by its position and partly by the lower level tube bank 228. The upper level is also occupied by the economizer 202 at the cooler gas end, by certain connections and by the separator-collector 232 located between the economizer 202 and the superheater 242.

The generator includes an economizer 202 at the cooler end of the gas passage receiving liquid from a positive displacement pump 289, the speed of which determines the quantity fed, as shown, connnectd to the hot well or other liquid source with a suitable feed liquid heating device.

The economizer 202 comprises adjacently located upright inlet and outlet headers 200 and 201, respectively (Figs. 3, 4 and 7), connected by the horizontal flat sinuous tube coils in parallel, as shown, forming a transverse tube bank 202 and the surface of which is preferably so proportioned with respect to liquid input, quantity and liquid pressure, and to gas quantity and local gas temperature and relative gas and liquid speed that there is substantially no vapor formed therein, or actually none.

Liquid from the economizer outlet header 201 is conveyed by a tube 203 to a manifold tube 204 from which the liquid is then divided into equal parts to the several long tubes of the generating section. In this instance, there are five long small bore tubes in the generating section, and five fluid flow reistors 205, each of which resistors has a greater flow resistance, or pressure drop, than the particular long generating tube which it serves, to insure equal division of the liquid delivered to each of the long tubes 206, 207, 208, 209 and 210 constituting the generating section of the assembly and which comprises flat floor, two side walls, and roof portions of the furnace, and a tube bank at the end of the furnace as will be later set forth.

The long length of each of these generating tubes is divided into portions through which the unitary fluid flows successively, but always horizontally and upwardly as vapor is formed to thereby avoid vapor pockets, and each is given a special shape and position in a particular way, so as to form flat bare metal walls and the tube bank, and to receive the same amount of heat consistent with equal liquid feeds, and equal and desired condition of vapor delivered.

Figure 30:
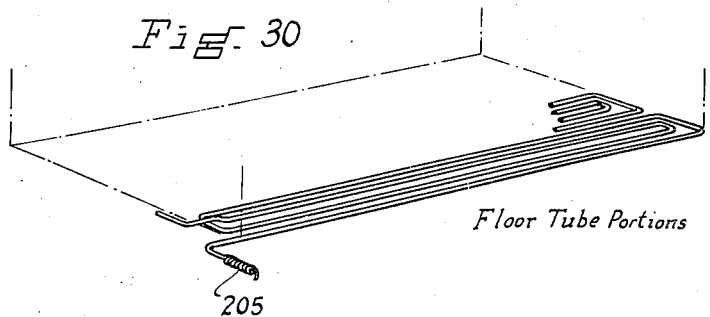
Fig. 30 is a perspective view of another tube portion bent to form a part of the floor of the furnace before a second part is bent to form a part of the two side walls and the rear wall.

The first part of the length of each of the five generating tubes is bent to form a flat coil of the full length and one fifth of the width of the furnace floor, and one of these fifths is shown in Fig. 30, the inlet end being supplied from the liquid distributor connector or manifold 204 through a resistor 205.

The outlet ends of the first part of the length of each of the generating tubes forming part of the furnace floor are connected to the inlet ends of the second part of the length which are disposed to form flat side and end walls, and the furnace tube bank 228. These connections are made by carrying each tube across the front of the furnace on the floor and upward at one side to tubes at different levels in the side wall, as at 211, 212, 213, 214 and 215, where the tube diameter is somewhat enlarged to allow for the volume of vapor to be formed.

Figure 28:
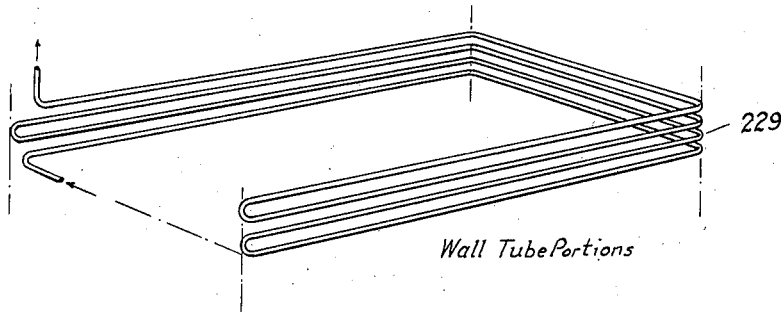
Fig. 28 is a perspective view of a tube portion as bent to form part of the flat walls for two sides and the rear of the furnace.
Figure 29:
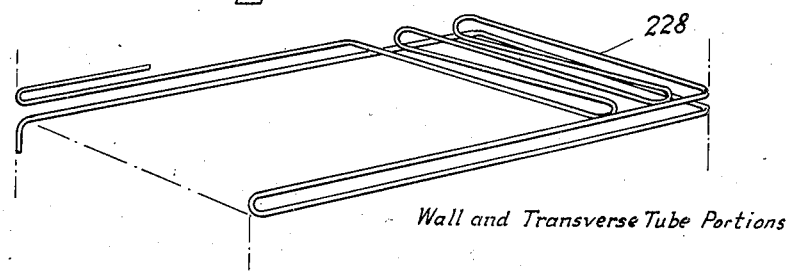
Fig. 29 is a perspective view of a tube portion as bent to form another part of the flat walls for two sides and the rear of a furnace, and also a part of a tube bank swept by hot gases in the rear end of the furnace cooperating with a tube bent as in Fig. 28 for the rest of the two sides and the rear wall.

The second portion of the length of a generating tube is bent around two sides and the rear end of the furnace wall starting at the front end of one side wall and ending at the front end of the other side wall, and then by a return bend of zero radius is brought to a higher level, the tube, by reason of the zero radius of the bend, returns in contact with the next adjacent portion to the starting point, reversing thus as many times as is necessary to form a fifth of the height of the furnace, as shown in Fig. 28. To form a tube bank 228 in the rear of the furnace and inside of its walls, each alternate tube in the height is given an additional bend to pass several times, here shown as four, across the furnace, starting and ending at one side wall as shown in Figs. 9, 16 and 29.

Where a tube reverses at the end of a side wall to rise from lower to the next higher level, it is kept in contact by a zero radius return bend which is also without projection on the outside so that adjacent return bends may contact to permit contact of adjacent tube portions, such return bend will be described in detail later; thus there is formed a complete bare tube wall that requires no refractory and that absorbs heat from the furnace to vaporize liquid, the liquid and vapor mixture always rising to a higher level or flowing horizontally, but never downward to a lower level.

Figure 31:
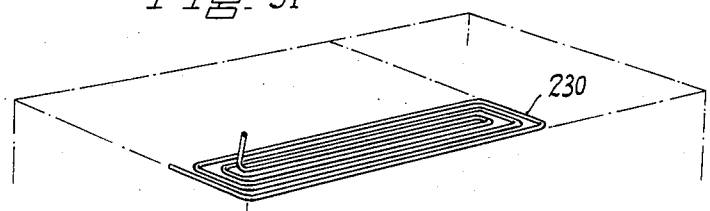
Fig. 31 is a perspective view of a tube portion bent to form a part of the roof of the furnace and leaving a space between the end of the roof and the end of the furnace for gases to rise upward past the roof level, this part of the tube being beyond the part that forms a part of the two side walls and the rear wall.

The third part of the length of each generating tube is bent to form, as shown in Fig. 16, a one fifth part of the width of the furnace roof 230, and the whole length of each one fifth part is less than the length of the furnace as shown in Figs. 16 and 31. The second and third tube length parts are joined by other bends at the front end of one side wall, and across the front end of the roof, and each tube is then bent out of the plane of the roof upward and along one side to the vertical cylindrical separator-collector 232 located above the furnace.

The adjacent tube lengths in the side walls are joined at the front end of the wall by a zero radius return bend made by combining two tubes as shown, for instance in Figs. 18 to 21 inclusive; the tube lengths 221 and 222 are placed in contact throughout their length, the end of one tube at one end is welded to the end of an adjacent tube at the same end by depositing weld metal at the ends to fill out the V-shape spaces on either side of the tangent joint just at the end, as indicated at 223 and 224, the weld metal also is extended across the tangency point so as to unite the two tubes against leakage, as at 225. The resulting exterior contour of the combined tube ends is then in the nature of two semi-circles with a rectangle between (see Fig. 19), and this then has flush welded to it, so that there is no exterior projection or rib, a cup-shaped cap 226, the periphery of which conforms to that of the joined tube ends as indicated at 227; there is thus formed a juncture which is a zero radius return bend (that is of zero internal radius). At the plane of junction of tube end proper and the space formed beyond, or in the cap, the flow area increases from that of a circle to that of a half-circle, plus a half-square tangent, plus a rectangle of width equal to twice the tube wall thickness. This is of advantage in minimizing flow resistance at so sharp a bend. The cap may be given a thickness suitable for its shape and greater than the tube to resist high pressure, but at the welding edge it preferably has the same thickness as the tube wall, and is flush welded on the outside to permit surface contact between bends so adjacent tube lengths are in contact.

Where the tubes pass upward from the furnace roof to the separator they extend through a sealing plate 231 of suitable alloy metal capable of withstanding the temperature and character of gases without deterioration. This alloy plate makes a gas seal for the roof tube division wall that separates the gas passage of the vapor generator into a horizontal U-shape, the said plate 231 extending back only to a support located above the upper row of screen tubes and there resting on the pancake coils.

The ends of these tubes project upwardly through the sealing plate 231 and, as shown, tangentially enter a bulge in the fluid flow path which is in the form of a separating chamber 232 dividing the fluid into liquid and vapor; the separator is closed by any suitable standard type of hand hole closure 233.

Where the end portions of the tubes 216-220 inclusive pass through the sealing plate 231, it is necessary that the hole through the plate should be larger than the curved portion by a sufficient amount to allow for the bending of the tube upward from the roof plane and to compensate for the expansion and contraction of the tube portion, as a consequence the plate is slotted, as in Fig. 27, and has welded to it, at each of these locations, a somewhat conical shaped skirt member within which the tube bend lies, and which member carries the upper flange 234 having spaced therefrom, by the filler annulus 235, another flange 236, and between these flanges is located a movable collar member 237 guided in the space and welded to the tube portion, as shown at 238; the result being that as the tube portion 216 changes length with reference to the plate 231 the collar member 237 slides between the flanges 234 and 236 while still providing an adequate gas seal to limit gas leakage from the furnace which operates above atmospheric pressure and under a higher pressure than the remainder of the gas passage above the furnace.

The separator 232 is a cylindrical chamber or bulge in the flow path of the working fluid at the end of each of the multiple parallel flow generating tubes. The generator tube portions 216 to 220 inclusive, as previously stated, enter the separating chamber at a location midway of its height, and with their entrances directed tangentially so that, as the fluid is discharged through these generator tube portions into the separator, a swirling effect is produced and by centrifugal force concentrates the liquid next to the wall and separates the vapor from the liquid. Inasmuch as liquid level in the separator is an important factor of control and regulation as explained later, it becomes essential that, once the separation has taken place, the swirling motion of the liquid should immediately cease so that a free gravity formed liquid level may be attained. To that end there has been included in the separator chamber, below the level of delivery openings of the generator tube portions 216 to 220 inclusive, an upright structure including a conical cap 239, and between it and the bottom of the separating chamber several vanes shown as radial vertical plates or fins 239' which eliminate the swirl of the liquid resulting from the tangential discharge and permit the liquid to come to rest with a free gravity level in the separator, and the lower part of the separator thus becomes a liquid collecting chamber in which a pool of liquid may be retained, the level of which depends on the relation of rate of liquid inflow to outflow.

It will be noted that this separator is subject to heat of combustion gases throughout a portion of its height.

From the separator saturated vapor is withdrawn through the passages 240 to the upright inlet headers 241 of a superheater 242 which comprises a number of horizontal flat coils in two sets extending across the gas passage above the furnace throughout its full height and width and along the walls, connected in parallel between vertical inlet headers 241 and vertical outlet header 243. The superheated vapor leaves the outlet header through the connection 244 for a vapor utilizing device such, for instance, as a turbine or the like. The superheater horizontal flat coils provide heat absorbing and protection surface to the walls of the gas passage and are located beyond a gas chamber 245 where gas flow reverses from the lower forward first pass in the furnace to the return pass above it, so as to equalize the flow of hot gases over the several superheater tubes. Each of the several tubes of the superheater is continuous from inlet to outlet header and bent in a horizontal plane to form a part of a superheater tube bank in the gas passage and also a part of the wall of the gas passage on both of the opposite sides, as well as the end of it. As shown in Fig. 33 one such tube crosses the gas passage eight times with return bends at the end of each straight transverse part, and lies on two sections of the length of one side wall, one section of the length of the other side wall and across the whole of the end wall. Immediately above and below, such a single bent superheater tube, there is another tube similarly bent but in reverse direction, so as to lie on that portion of the length of the side walls not occupied by the adjacent tube at the upper or lower level, but also lying elsewhere on those portions of the length of the side wall that are occupied by the adjacent tubes, and the same for the end wall. Thus the end wall, and parts of both side walls of the gas passage, have horizontal superheater tubes in contact making a continuous bare metal wall for the gases, while at parts of the side wall the horizontal superheater tubes alternate from top to bottom with spaces of one tube diameter and of a width equal to that of the chamber. The bottom one of the set of horizontal bent tubes of the superheater rests on the bottom of the gas passage, and it is arranged to support the one above it, by locating the return bends of the part that crosses the gas passage so that their centers are offset, and the horizontal projections intersect. Thus the entire superheater is self-supported from the bottom.

By means of the arrangement of the superheater tubes horizontally at different levels between vertical inlet and outlet headers, any liquid in the superheater, when the generator is started for example, will gravitate to the bottom of the headers and fill the lower level tubes, leaving the upper tubes entirely free of liquid pockets and free for the flow of steam, and thus prevent the overheating of a superheater tube which would happen if a water pocket prevented vapor flow through it while flowing through other tubes free of steam pockets. In this superheater hot gases cannot damage any tube because each one is either full of liquid or is internally cooled by steam flow, and as the liquid in a lower level tube evaporates, the superheater acts temporarily as a water tube boiler, in part, until the liquid has been wholly and safely evaporated, while the rest of it functions as a superheater, and ultimately all of it. This feature of my superheater is shown diagrammatically in Fig. 34, where 232 is the separator delivering saturated vapor to the vertical inlet heater 241 through connection 240. The horizontal bent superheater tubes are indicated at 242 delivering to the vertical outlet header 243 from which superheated vapor leaves by pipe 244 at a rate controlled by the throttle valve 244'. A second valve at 244'' is a drain opened for starting and before the throttle 244' is opened, and kept open until all liquid in the superheater has disappeared.

It is to be noted that each of the several tubes of my twin coil bottom supported superheater is so bent (see Fig. 33) as to not only provide a bank of tubes for transverse flow of gases but also as to protect the walls of the gas passage, and also so that each tube is equally swept by gases at the same temperature in different sections of the gas stream and thus equality of superheating in each is assured. It is also so located and of such surface area as to avoid excessive outlet vapor temperature at all loads.

The economizer tubes are horizontal like those of the superheater and the vapor generating tubes, and each tube is bent in a manner that has features of similarity, in that parts of the length of a tube form a transverse bank across the gas passage, other parts form portions of side walls, and other parts provide support for tubes at higher levels, the whole being supported on the lowermost tube. Some of these economizer tubes are shown in Fig. 32 (one in full and another in dotted lines for clarity) as bent in a series of loops between the vertical inlet header 200 and the vertical outlet header 201, where two single loops lie longitudinally of the gas flow and two multiple loops lie transversely, parts lying in both side walls. Such bent tubes are supported by those below, and each is swept by gases equally and at the same temperature so that the liquid discharged by each will be equally heated. The horizontal position between vertical headers prevents the formation of pockets of vapor or of gases released from solution in the liquid and thus prevents local overheating of the tubes.

Equalization of heat absorbed by the vapor generator tubes is also assured by their position, and by providing for equalization or proportioning of liquid feed quantity and temperature to each of the five long small bore tubes in parallel, equalization of quality of vapor or ratio of liquid unvaporized to vapor produced is assured, and each generating tube is kept wet internally by control of ratio of heat made available to quantity of feed, thereby overheating is prevented and, as will be described later, this is accomplished with a minimum of excess liquid.

To assure equalization of heat absorbed by each of the several parallel connected generator tubes, each one is so bent and so located as to be equally exposed to radiant heat of the furnace and equally swept by hot gases. Each tube occupies a portion of the height of each furnace side wall from end to end at a given level and a portion of the end wall at the same level, and each one makes one or more transverse passes across the gas stream in the furnace within the same level limit. Each tube also occupies a portion of the width of the furnace bottom and of the furnace roof from end to end of each. At the same time the burner is in one end of the furnace, the flame and the gases flowing longitudinally straight through it, so there is thermal-symmetry all around the cross section of the furnace, and any change in gas temperature or intensity of radiation longitudinally affects each of the several generating tubes to the same extent no matter how the load changes.

In the screen portion 228 of the generator tubes, where they cross the gas passage, and between alternate layers of coils, there may be disposed stream lined bodies 246, as shown in Figs. 5 and 6, which are of polished heat resisting alloy metal; these are carried in side pieces 246' resting on the tubes. They are stream lined to minimize gas flow resistance and they serve not only to reflect radiant heat but provide a restriction of the gas flow area between tubes of the screen such that there is a perceptible increase in velocity with a consequent better transfer of the heat to the absorbing surfaces from the hot gases passing the same.

It will thus be seen that there is provided a super-heating vapor generator construction and arrangement in three sections, each comprising a multiplicity of long small bore tubes connected in parallel, namely, an economizer, a vapor generator proper and a superheater, with a different multiple of tubes in the generating section that in the others, the tubes in each section being always horizontal and bent to form tube banks across and flat walls at the boundary of two horizontal gas passages, one over the other, the lower one being the furnace, and with such fastening of the tubes as to prevent overheating, equalize the heat received by each of several tubes in parallel in each section, insuring maximum flexibility of operation from zero to maximum of capacity, least weight and occupying least space, and adapted to automatic control of heat made available for absorption in relation to superheated vapor delivered as described later.

Surrounding the vapor generator assembly, and lying closely adjacent the flat wall tubes throughout is a heat resisting alloy metal plate 247 acting as a gas seal, and outside of which there is a light weight insulating material 247' practically devoid of thermal storage capacity, and applied, if desired, in more than one layer, as shown, a second layer 248 having been applied to the exterior, and which outer layer may be 85 per cent magnesia or the like, all of which may be finally covered, in any suitable manner, such as by sheet metal as mentioned later.

Embedded within this insulating material and, in fact, erected before the insulating material is applied, is a framework of steel beams and uprights which act as a support for the various portions of the vapor generator assembly and include structural angle uprights at each corner of the assembly, as well as the horizontal angles, all of which are connected to other structural elements as by welding or the like for the purpose of forming a framework. Heavier structural members 250 are placed across the top and to which are secured, by nuts 251, the high temperature alloy suspension members 252 having foot members 253 also of alloy which support the ends of the flat coils of the lowermost economizer tube in the cooler portion of the gas path.

At the sides of the generator, as shown in the enlarged detail in Fig. 22, are upright I-beams 254 on the inside face of which are secured, as by welding, the members 255 which, in turn, receive lugs 256 carried by the tubes forming the flat side walls of the furnace; these lugs function to retain the side walls flat and in proper position.

Figure 2:
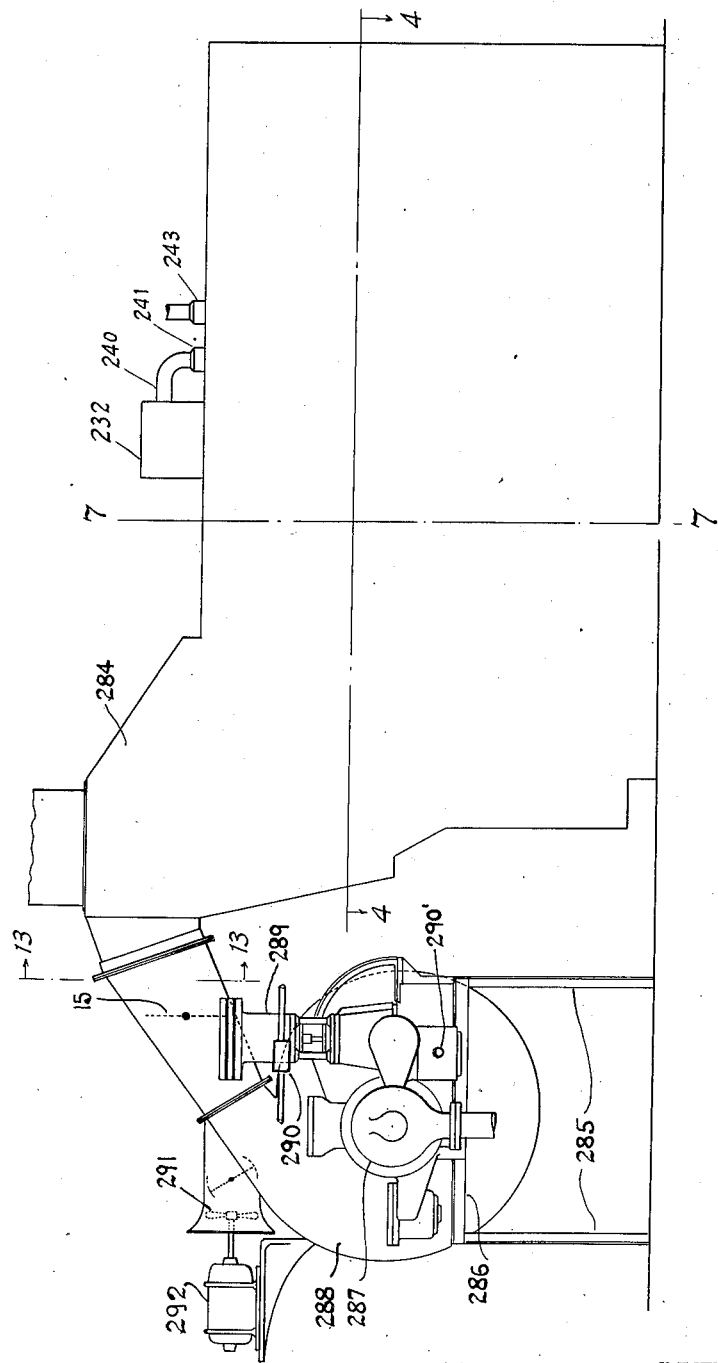
Fig. 2 is a side elevation of the vapor generator and auxiliaries.
Figure 14:
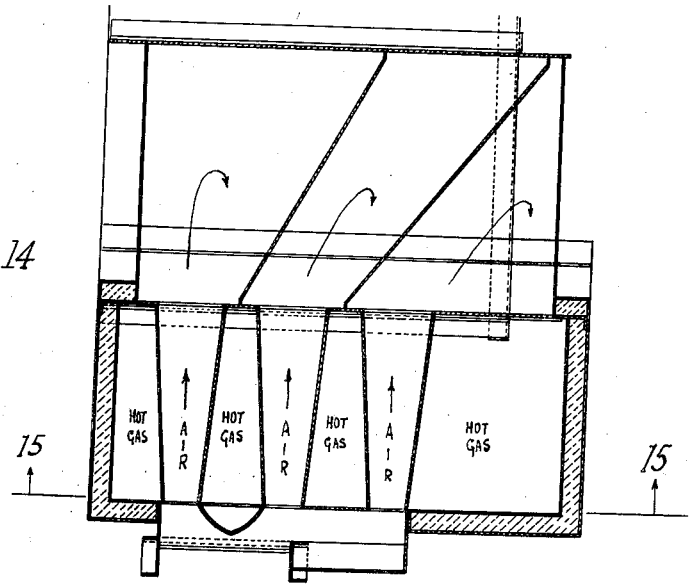
Fig. 14 is a transverse sectional view on the line 14—14 of Fig. 15.
Figure 15:
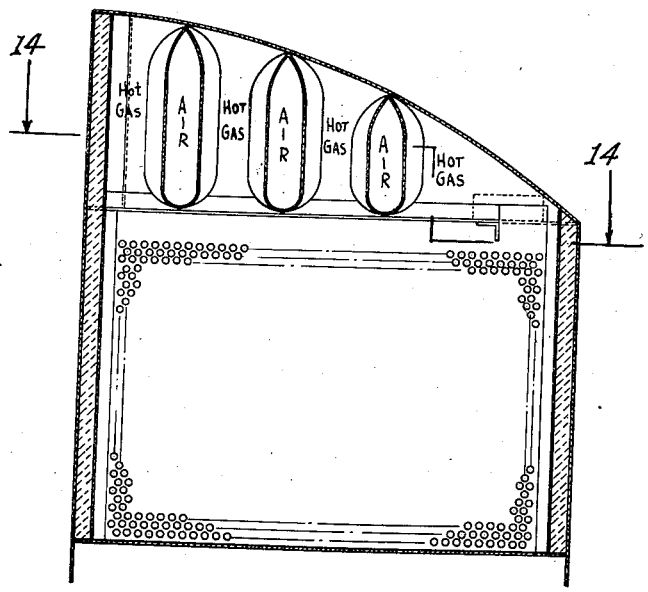
Fig. 15 is a transverse sectional view of the plane of line 15—15 of Fig. 14.

The outside of the insulation 248 is encased by metal cover plates 257 secured to the upright structural members as a protective means for the insulation and the total outside assembly thus appears as in Fig. 2 and provides a gas tight furnace and gas flue constructed to withstand an internal gas pressure considerably above that of the outside air pressure.

The front or firing end of the assembly is built up of a rectangular framework to provide a burner entrance with a refractory ring 258 to which is secured, by the tie bolts 259, a face plate 260 mounting the burner ring 261 having air vanes 262. Beyond the vaned burner ring there is positioned the conical impeller plate 263 adjustable slidably longitudinally of the tubular member 264 mounting the same and carrying the mechanical or steam, or combination oil atomizing and feeding head 265 movable along the support 264', as indicated, by loosening the thumb screw 266, this burner head having oil feed and atomizing steam supply 267 and 268, respectively, controlled by valves.

The burner air chamber is entirely enclosed and insulated as indicated at 269. It has guide vanes and comprises a scroll shape wall 270 to distribute air entering one side from an air heater 271 by way of a rectangular opening. The vanes divide the chamber entrance area into air passage increments 272, 273, 274, 275, 276 and 277; and these increments extend around to the burner ring entrance so that there is an equalization of the air supply to the burner throughout the circumference of the burner ring. The sweep of these vanes, and the extended ones 278 in the windbox of the burner, are very carefully shaped and stopped off at the right locations to insure a uniform delivery of air throughout the entire burner circumference as before stated, even if the air entering the burner air chamber is not equally distributed across the chamber entrance area.

In order to provide for ignition of the oil spray the burner entrance ring 258 has an opening 279 through which there extends a gas burner and automatic lighting device, not shown; this is supplied with air through openings 280 into the secondary windbox 281 back of the face plate 260. Above the rectangular opening 271 is a tubular air heater 282 through the tubes of which pass the spent combustion gases from the vapor generator and which then leave through the flue 283. This air heater, as will be evident, is at the firing end of the vapor generator, and over it, and the air enters it at 284 and traverses the bank of tubes 282 of the air heater directly to the burner air chamber or windbox so that the heat imparted to the air in its passage through the air heater 282 is not lost and the flow resistance is minimized by reason of the short travel of the air from heater to burner.

To insure that the full capabilities of my vapor generator are realized in operation, auxiliary apparatus of proper cooperative kind, and with appropriate controls, are provided, so that the combination has all of the use characteristics required for motive power service of the type previously described involving flexibility over the whole range from zero to maximum capacity per unit, high efficiency, light weight and small space requirements for any size above that used in small automobiles.

These cooperative auxiliaries and controls which insure that the vapor generator will operate to the best advantage, producing superheater vapor at any rate required by the prime mover, without overheating or damage to any of the parts, and with so little heat storage as to be immediately responsive to changes of vapor quantities required for the operation of the vehicle to be driven, and the corresponding change in feed, are of a certain kind of arrangement, and they are provided with automatic controls responsive to the rate of delivery or withdrawal of vapor.

Prior to starting, the vapor generator is filled with water up to the stop or throttle valve 244', Fig. 34, which is closed and the vent valve 244'' which is also closed after filling or open only slightly. This prevents overheating of any part after the burner begins to operate and before flow of liquid and vapor inside of the tubes is established, as it is necessary to avoid the heating of a tube that is dry inside and through which there is no flow, or an inadequate flow of fluid to absorb enough heat from it to keep its temperature low enough to be safe.

To start the operation of the vapor generator after it has been filled with water, the gas is turned on at the starting gas burner and ignited. At the same time an auxiliary starting motor 292 supplies air, and fuel is also supplied to the burner, which then ignites from the gas flame, and when ignited the gas is turned off. Burning of the oil causes the liquid in the generator to heat and some of this hot liquid, followed by vapor, escapes from the valve 244" which has been opened enough to serve as a vent but not enough to prevent use of pressure developed. As soon as pressure vapor is discharged from the vent the vent valve is closed, and a valve 244' is opened to deliver the vapor to an auxiliary turbine 287 driving all the normally operating auxiliaries which include a blower 288 for combustion air, a liquid feed pump 289 and a liquid fuel pump 290. From this time on the entire operation is automatic, the delivery from these auxiliaries being controlled in proportion to vapor output on the one hand, and on the other hand so as to insure an excess of liquid in the vapor generator tubes from end to end, the level of liquid thus secured in the separator acts as a cooperative control to maintain the proper rates of fuel to water or other liquid feed.

In front of the firing end of the vapor generator, mounted on uprights 285, is a platform 286 which carries an auxiliary turbine 287 driving, through suitable gearing, the blower 288 furnishing air to the windbox 284, and at the same time also driving the reciprocating feed pump 289 delivering working liquid to the generator, as well as the oil pumps 290 and 290' for lubricating and fuel oil, respectively.

An auxiliary fan 291, driven by a motor 292 independent of the turbine 287, on starting, supplies air for the ignition burner 279; as soon as pressure is developed in the vapor generator, vapor is supplied to the turbine 287 for driving the feed pump 289, fuel oil pump 290', and blower 288. Variation in the speed of the auxiliary driving turbine 287, produces corresponding variations of delivery of working liquid to the generator, and in the fuel and air to produce the heat to vaporize and superheat it, and, as will be described later, the auxiliary turbine speed is controlled automatically by the rate of superheated vapor delivery.

After the auxiliary driving turbine has begun operation and the superheater has lost its initial starting liquid by evaporation, and vapor is flowing through it, and liquid is being supplied to the generating tubes to replace the vapor formed, the separator prevents any liquid from reaching the superheater. To insure that all vapor generator tubes are kept wet the liquid feed is proportioned to the fuel and air supply so as to be more than can be evaporated, and to always deliver liquid to the separator. This excess liquid is constantly withdrawn from the separator and such withdrawn liquid is termed the "spillover". The continuous supply of excess liquid to the vaporizer, and the also continuous withdrawal of it from the vaporizer has the effect of establishing a pool of liquid in the separator at a level determined by the adjustment of the area of the outflow. Variations in the level are caused to control the spillover area automatically in a manner to be hereinafter described in connection with the control system.

The tubular connection from the separator, located in the path of hot gases, to the level controls external to the generator, must be protected against overheating damage; for doing this, means such as is illustrated in Figs. 25 and 26 may be employed wherein the connection 292 is enclosed within a sleeve 293 spaced from the connection and closed at both ends, a cooling fluid, such as in this instance the spillover from separator 232, is circulated in the said space.

The automatic control system which cooperates with the vapor generator is shown diagrammatically in Figs. 35 and 36.

Referring now in particular to Fig. 35, I illustrate the fluid flow path as a single sinuous tube, to the economizer section 202 of which, liquid is supplied under pressure through a pipe 11 from a pump 289, which may be of any suitable type and which I have therefore illustrated merely diagrammatically. From the economizer section the fluid passes to and through the generating section discharging into the separator 232. From the separator, vapor passes to and through the superheater 242, leaving by the conduit 244 to a main turbine 12 illustrative of a vapor utilizing device. Products of combustion pass successively through the generating section, superheater, and economizer and air heater, and may contact a part or all of the separator.

An auxiliary vapor motor here shown as a turbine 287 drives the liquid feed pump 289, the air blower 288, and the fuel oil burner supply pump 290. While I have illustrated these devices diagrammatically and as though all are located to be driven by the same shaft and at the same speed, it will be understood that the necessary gear reduction, or driving connections between the several devices, are known and would be properly designed as to relative speed, power, auxiliary capacity, etc., and that I merely intend to indicate that the auxiliary turbine 287 drives the devices 288, 289 and 290 simultaneously and in unison.

The liquid feed pump is of such capacity in relation to the capacity of the fuel oil pump and air blower, as to insure delivery of a greater quantity of liquid than the heat of combustion of the fuel and air can evaporate, this is to insure an excess of liquid and maintain a continuous spillover from the separator.

Excess liquid is diverted from the fluid flow path in the separator through a pipe 1 to the hot well or to waste. A normal continuous spillover occurs through the restriction 2 while a variable spillover occurs through a regulating valve 3.

The furnace of the vapor generator includes an oil burner 4 supplied by a pipe 5, and an air chamber 6 supplied by a conduit 7. In order to provide for ignition of the oil-firing means, a gas-firing device 8 is supplied by a pipe 9 with a flow of gas under the control of a solenoid actuated valve 10.

The rate of supply of fuel oil to the burner 4 is primarily controlled by the speed of the oil pump 290, but the supply of oil is further regulated by the throttling of a regulating valve 13 located in the pipe 5; and the rate of flow is continuously measured by a meter 14.

The rate of supply of air to support combustion is primarily determined by the speed of the blower 288, but is further under the control of a damper 15 positioned in the conduit 7 between the blower and the air chamber 6. The rate of supply of air is continuously measured by a flow meter 16.

The rate of supply of liquid working fluid under pressure through the conduit 11 is controlled by the speed of the pump 289 in turn under the control of variables in the operation of the system.

The speeds of the liquid pump, air blower and oil pump, have a constant relation one to the other determined by the mechanical connection of each to the driving shaft of the auxiliary driving turbine and the speed of all three varies with the speed of the turbine. To insure the proper relation between the quantities of liquid, fuel oil and air delivered by their respective impellers when these impellers have a fixed speed relation and also to insure the proper relation of all of them to the rate of delivery and use of vapor, certain adjustments are provided and they become operatively responsive to certain variables which are measured, indicated, and utilized as a basis for automatically controlling the supply of liquid thereto and the supply of the elements of combustion to the heating furnace.

I indicate at 17 a pressure responsive device such as a Bourdon tube connected to the conduit 244 and having an indicator pointer 18 adapted to cooperate with an index 19 for advising the instantaneous value of the vapor outflow pressure.

As an indicator of output, rate of vapor delivery or load upon the vapor generator, in relation to the pressure responsive device 17, I provide another pressure responsive device such as a Bourdon tube 20 adapted to position an indicator pointer 21 relative to an index 22. The Bourdon tube 20 is connected by means of a pipe with the turbine 12 at a location such that the Bourdon tube will be sensitive to first stage shell pressure of the turbine, which pressure for a given value of pressure indicated by 17 bears a substantially straight line relation to ratio of steam flow. Thus the pointer 21 will indicate on the scale 22 a reading which, relative to that of pointer 18 on scale 19, is representative of rate of flow of steam from the vapor generator and thereby an indication of output or load upon the generator.

Connected to the separator 232 there is a device 23 responsive to liquid level within the separator 232. It has a pressure casing enclosing a mercury U-tube connected across the vertical elevation of the separator. A float is adapted to rise and fall with the surface of the mercury in one leg and to thus cause a positioning of a pointer 24 relative to an index 25 showing the instantaneous liquid level within the separator.

The flow meters, 14 for fuel oil, and 16 for combustion air, cooperate to position the stem of a pilot valve 26 from predetermined position, should the ratio between air flow and fuel flow depart from that desired. The pilot 26 is adapted to control the positioning of the fuel supply valve 13.

The Bourdon tubes 17 and 20 each position the stem of a pilot valve for establishing an air loading pressure within the relay mechanism 27 from which a resultant air loading pressure is applied upon the diaphragm loading means 28 controlling the auxiliary turbine.

I preferably primarily control the supply of liquid to the fluid flow path and elements of combustion to the furnace, through variation in speed of the auxiliary turbine, utilizing the vapor outflow pressure and the turbine shell pressure as a basis for such control. Realizing, however, the possible difference in speed-capacity characteristics of the pumps and blower, as well as variations in conditions of operation, I provide readjusting means to supplement the primary control of the elements of combustion. For the air, such readjusting means comprises the damper 15 positioned at the outlet of the blower 288 by a pneumatic actuator 29. For the fuel, the readjusting means comprises the regulating valve 13 positioned in the pipe 5 responsive to departure from desired relation of the measure of fuel flow and the measure of air flow.

It is primarily desirable to vary the speed of the auxiliary turbine in step with the rate of vapor used by the main turbine so as to roughly proportion liquid and the elements of combustion to the vapor generator according to the main turbine load; then to individually readjust the supply of fuel and air according to other variables in the operation of the system.

To adjustably determine the speed of the auxiliary turbine I preferably provide a pump, compressor or similar device 30 driven by and with the auxiliary turbine to establish a fluid pressure (such as an oil pressure) bearing a known relation to speed. I then utilize this oil pressure in a governing mechanism normally tending to hold the speed of the auxiliary turbine constant regardless of pressure of vapor supplied it. I then load up the oil pressure responsive device according to variations in vapor generator and main turbine operation, thus furnishing the speed requirements that the variable speed governor of the auxiliary turbine must work to.

Oil from the pump 30 passes through a pipe 31 (having a return connection 32) to an expansible metallic bellows 33, adapted to position one end of a floating link 34. The other end of the link 34 is moved by and with a power piston traveling in a cylinder 35 and adapted to move the vapor admission valves of the auxiliary turbine. A pilot stem 36 is suspended from the link 34 intermediate the ends thereof and controls the flow of oil under pressure through a pilot casing 37 to the opposite sides of the piston 35. A normally open regulable valve 38 is positioned between the pressure pipe 31 and the return pipe 32 to provide a by-pass around the pump 30. A fixed resistance 38' is in line 32.

The pilot valves indicated as at 26 and 37 are shown in detail in Fig. 37 and form the subject matter of U. S. Patent 2,054,464, granted Sept. 15, 1936.

Fluid under pressure is supplied to the interior of the casing 37 intermediate the pilot lands 39, which lands are so spaced along the stem 36 as to coincide with narrow annular ports 40. When the pilot valve stem is axially moved in the casing so that the lands 39 are moved relative to the ports 40, then a definite loading pressure is available in the annular ports bearing a known relation to the amount of such movement. For example, if the stem 36 is moved upwardly there is available at the upper right-hand exit of the casing (Fig. 37) a loading pressure increasing in definite relation to said movement, while if the stem 36 is moved downwardly there is available at the lower right-hand exit a pressure increasing definitely with such movement.

Certain features relating to the turbine governor control herein disclosed but not claimed form the subject matter of the co-pending application of Paul S. Dickey, Serial No. 55,022 filed Dec. 18, 1935.

The level responsive device 23 (Fig. 35) is adapted to position a pilot valve stem 41 for emergency and sequential control of variables in the operation of the system. It will be observed that both the upper and lower right-hand exits of the pilot casing are in use; the upper exit being connected to an emergency fuel shutoff valve 42 in the pipe 5, and the lower exit being connected to the regulated spillover valve 3, the air damper actuator 29, and the by-pass valve 38.

Referring now to Fig. 41 I illustrate therein, by means of a graph, the operation under the control of the device 23 responsive to level within the separator drum 232. The spillover connection 1 may coincide on level with the bottom of the separator or may be slightly above it. It is not desirable to have the water level unseal the spillover connection, and therefore I indicate as a lower safety limit a level slightly above the spillover connection. From this zone upwardly to an upper safety limit is the zone of control and this is divided roughly into a zone of air throttling and a zone of increased spillover.

The design of the pilot valve stem 41 as well as the various air actuators 3, 29, 38, 42 is such that the air pressure established at the two exits of the pilot valve cause the actuation or positioning of the various actuators in desired manner and sequence. If level within the separator drum is at approximately mid-point, then conditions are as desired. The damper 15 will be at its wide open position and very little if any excess diversion or spillover is passing through the valve 3. If, however, due to operating conditions the level within the separator begins to rise, then throughout the indicated range on Fig. 41 there is an additional spillover or diversion through the valve 3 as such valve is opened progressively with rise in level. That is, as the level in the separator rises, the pilot valve stem 41 is lowered and the air pressure effective upon the valve 3 is increased proportional to the axial movement of the pilot valve stem 41. Should the level continue to rise despite the increase in the amount of spillover and eventually reach the upper safety limit, then when this point is reached the increased air pressure effective upon the by-pass valve 38 will begin to overcome its loading spring and close the by-pass valve, building up the pressure within 33, to the end that the speed of the auxiliary turbine will be reduced and if the level continues to rise it may in fact stop the auxiliary turbine.

Throughout the zone of increased spillover the damper 15 is left at its widest open position. Should level within the separator fall from approximately the mid-position or an otherwise predetermined position, then through the zone marked "zone of air throttling" the damper 15 will be throttled toward a minimum opening position and inasmuch as the amount of air flow acts through the fuel flow—air flow ratio meters to control the fuel flow valve 13, this at the same time will control the fuel supply. Thus if for some operating reason the level within the separator decreases below the normal desired value, the supply of fuel and air to the furnace is progressively decreased until a balance is reached and the liquid level returns or tends to return to the desired level.

Should the level continue to drop to the lower safety limit, this action brings into play the uppermost land of the pilot valve stem 41 to vary the air loading pressure upon the valve 42 and if the lower safety limit is reached the valve 42 shuts off the fuel supply means and burner. Whenever the level is above this safety limit, however, the burner and fuel supply are normally available unless shut off from some other safety arrangement.

In Fig. 36 I illustrate the same general arrangement as that of Fig. 35 but with a modification in so far as the control from level within the separator 232 is concerned. A graph of operation is shown in Fig. 42 and differs mainly in that the upper portion of level is used as a zone of water pump by-pass rather than as a zone of increased spillover. The upper and lower safety limits may be provided and utilized in manner similar to that of Fig. 35.

The level device 23 is adapted to position the pilot valve stem 41 for establishing an air loading pressure from the upper right-hand exit of the pilot casing, varying substantially proportional to axial positioning of the pilot valve stem and therefore according to level within the separator. Such air loading pressure is effective upon the air actuator 29 for positioning the damper 15 and upon the air actuated valve 43 in a by-pass around the water pump 289, Fig. 36. When the level is at the desired elevation in the separator, the damper 15 is at its widest open position and the by-pass valve 43 is closed. Should the separator level increase above this point then the by-pass valve 43 begins to open and a portion of the water pumped will recirculate through the pump, thus decreasing the flow through conduit 11 but without varying the speed of the auxiliary turbine, and thus the rate of supply of fuel and air.

Should the level decrease below the desired value, then with the by-pass valve 43 closed the damper 15 would begin to be throttled and slightly reduce the firing without change in rate of supply of liquid to the system until the liquid level returns to the desired value.

Referring again to Fig. 35 wherein both exits from the pilot casing are used, it is possible to so vary the loading of the different air actuated devices controlled from said pilot valve that they will pick up in sequence or overlap. Graphs 41 and 42 indicate a substantially straight line control in direct sequence between the different zones of control. Reference to Fig. 43 will illustrate that the zone of air throttling for example may be with a control other than a straight line and that the zone of excess spillover or by-pass of the pump may be in curved relation of the same curvature or difference and that the two curves may overlap.

To illustrate such operation, attention is called to Figs. 39 and 40, which indicate different shapes of pilot lands wherein for example, the long gradual taper of Fig. 40 is of an entirely different sensitivity than the substantially spherical lands of Fig. 39. A different amount of axial movement of the pilot valve stem in one case is required for the same change in air loading pressure, and correspondingly the same axial movement results in a different change in air loading pressure, and thus the sensitivity is different the one from the other.

I may readily construct a pilot valve stem as in Fig. 38 having pilot valve stem lands of different sensitivity relative to the two exits, and furthermore these may be spaced along the pilot stem so that they will pick up and begin to change the air loading pressure at the different exits either to provide a straight sequential pick-up of the two curves end to end, as in Fig. 41 and 42, or a gap between the two wherein no variation is made in either the amount of spillover or the control of the air, or the curves may overlap and for a central portion of the level variation both spillover and air control be varied. Furthermore, the shape of the pilot valve stem lands, as well as the loading and shape of the springs at the valves and at the air actuator 29, may be such as to counteract damper characteristics or functional relation between level within the separator and air flow or damper position.

I indicate in Fig. 44 an arrangement of the level responsive device 23 wherein two pilot valves may be utilized and picked up over different ranges of travel of the arm 24. For example, if the level rises above a mid-point the arm 24 will engage the valve stem of the uppermost pilot valve and begin to raise the same. If the level falls below the mid-point then the arm will begin to depress the pilot stem of the lowermost pilot valve. At a central level no movement of either of the pilot valves will occur.

While I have chosen to illustrate and describe certain preferred embodiments of the invention, it is to be understood that this is by way of illustration only and that I am not to be limited thereby except as to the claims in view of prior art.

The construction and operation of the fuel burning means disclosed herein is disclosed and claimed in my divisional application Serial No. 212,869, filed June 10, 1938. The furnace wall construction disclosed herein is disclosed and claimed in my divisional application Serial No. 212,870, filed June 10, 1938.

I claim—

1. In a light weight drumless forced flow vapor generator of small liquid and heat storage capacity for large variations in vapor demand with inappreciable time lag and having a flow passage continuous from liquid inlet to superheated vapor outlet comprised of long small bore tube lengths with a junction of tube lengths intermediate the ends of the flow passage providing a liquid and vapor separator, and with heating means including a gas flue enclosing the tube lengths and of low heat storage capacity, the generator having a supply for variables such as fuel, air and liquid the method of operation which includes introducing to the inlet end of the small bore tube lengths a balanced flow of liquid for each at a rate in excess of its conversion ability and filling the entire flow path with liquid until the vaporizing temperature is reached, draining liquid from the separator subsequent to the formation of vapor in the generating portion of the flow path to maintain a level in the separator, and adjusting at least one of the variables from an indication of said level.

2. In combination with an enclosed passage directing a stream of hot gases, a heat exchanger transversely thereof and having upright headers connected by a multiplicity of horizontally disposed tubes resting one upon another to form a bank, one part of each tube bent to form a part of the passage wall and a part of the transverse bank.

3. A vapor generator having a furnace and a multiplicity of long small bore vapor generating tubes heated in part by radiation and in part by convection, all of said tubes being horizontally disposed and connected for progressively upward fluid flow therethrough, each of said tubes being bent to have portions forming a part of the wall of the furnace and with portions disposed transversely of the path of gases from the furnace.

4. A vapor generator having a furnace and a multiplicity of long small bore vapor generating tubes heated in part by radiation and in part by convection, each tube bent to have contacting horizontal lengths extending in the direction of gas travel in the furnace disposed in a flat wall and arranged for progressive fluid flow therethrough always upwardly whereby the entire assembly is drainable to the lowermost location.

5. In combination in a vapor generator, a furnace comprised of flat sides formed of a multiplicity of long small bore horizontal tubes providing a fluid flow passage with fluid flow from liquid entrance to outlet always progressively upward, and some portions of said tubes disposed transversely of the gas flow, a liquid supply, each tube disposed with reference to the furnace and the hot gas stream to receive heat in proportion to its liquid supply but insufficient to vaporize all of it.

6. In combination in a vapor generator, a furnace comprised of flat sides formed of a multiplicity of long small bore horizontal tubes providing a fluid flow passage with fluid flow from liquid entrance to outlet always progressively upward, and some portions of said tubes disposed transversely of the gas flow, a liquid supply, each tube disposed to receive the same amount of liquid and the same fraction of total heat absorbed.

7. In combination in a vapor generator, a multiplicity of long small bore tubes having horizontal lengths forming walls of a flame fired furnace, and each individual tube comprising a part of the side walls, floor and roof of the furnace lying similarly longitudinally of the flame and hot gas stream in the furnace.

8. In combination, a vapor generator having a lower and an upper level, a furnace in one level having its walls formed of continuous horizontally arranged tube lengths providing a fluid passage, a gas seal between the two levels, except at one end of each, and an economizer and superheater in the remaining level also having horizontal tube lengths, all of said tubes being arranged for gravity draining.

9. In a forced circulation steam generator having long small bore generating tubes, a superheater, and a separator between the tubes and superheater, means delivering more water to the generating tubes than is evaporated in a single passage therethrough, and means providing for water in the superheater upon starting, said superheater being constructed and arranged to provide against overheating of any part thereof when water is in another part thereof.

10. In a forced flow boiler with a continuous flow path from liquid inlet to superheated vapor outlet and having a superheating section comprising headers connected by substantially horizontal parallel flow tube lengths with inlet and outlet above the tubes, the method of operation which comprises filling the flow path with liquid from end to end while heating the same, and then regulating liquid input upon vaporization to prevent entrance of additional liquid to the superheater portion of the flow path whereby the superheater may free itself of liquid by vapor generation, whereafter it functions as a superheater.

11. In a forced flow boiler with a continuous flow path from liquid inlet to superheated vapor outlet and having a superheating section comprising headers connected by substantially horizontal parallel flow tube lengths with inlet and outlet above the tubes and provided with a separating chamber between the generating and superheating sections, the method of operation which comprises filling the flow path with liquid from end to end including the separator while heating the same, and then withdrawing liquid from the separator upon vaporization to prevent entrance of additional liquid to the superheater whereby the superheater may free itself of liquid by vapor generation, whereafter it functions as a superheater.

12. In a forced flow boiler with a continuous flow path from liquid inlet to superheated vapor outlet and having a superheating section comprising upright headers connected by substantially horizontal parallel flow tube lengths with inlet and outlet above the tubes and provided with a separating chamber between the generating and superheating sections, the method of operation which comprises filling the flow path with liquid from end to end including the separator while heating the same, and then regulating liquid input while withdrawing liquid from the separator to prevent entrance of additional liquid to the superheater whereby the superheater may free itself of liquid by vapor generation, whereafter it functions as a superheater.

13. In a forced flow boiler with a continuous flow path from liquid inlet to superheated vapor outlet and having a superheating section comprising upright headers connected by substantially horizontal parallel flow tube lengths with inlet and outlet above the tubes, the method of operation which comprises filling the flow path with liquid from end to end while heating the same, and then diverting liquid from the flow path in advance of the superheater upon vaporization to prevent entrance of additional liquid to the superheater whereby the superheater may free itself of liquid by vapor generation, whereafter it functions as a superheater.

14. In a forced flow boiler with a continuous flow path from liquid inlet to superheated vapor outlet and having a superheating section comprising upright headers connected by substantially horizontal parallel flow tube lengths with inlet and outlet above the tubes, the method of operation which comprises filling the flow path with liquid from end to end while heating the same, and then diverting liquid from the flow path while regulating liquid inflow to prevent entrance of additional water to the superheater whereby the superheater may free itself of liquid by vapor generation, whereafter it functions as a superheater.

15. In a light weight drumless forced flow vapor generator of small liquid and heat storage capacity for large variations in vapor demand with inappreciable time lag, a flow passage continuous from liquid inlet to superheated vapor outlet comprised of a generating section having long small bore tube lengths, a junction of tube lengths intermediate the ends of the flow passage to provide a liquid and vapor separator, a superheater beyond the said junction having upright headers connected by substantially horizontal parallel flow tube lengths, heating means including a furnace and gas flue enclosing the generating and superheating sections and of low heat storage capacity, supply means initially introducing liquid to the passage inlet and at a rate great enough to fill the entire flow path including the separator and superheater on starting, and means for diverting liquid from the flow path to partially empty the separator when vapor generation occurs whereby the superheater is then enabled to free itself of liquid by vapor generation within itself.

16. In combination, a vapor generator having a lower and an upper level, a furnace in one level having its walls formed of continuous horizontally arranged tube lengths providing a fluid passage, a gas seal between the two levels, except at one end of each, and an economizer and superheater in the remaining level.

17. In combination in a vapor generator having a U-shape gas passage receiving hot products of combustion at one end and delivering spent gases at the other, vapor generating surface within the passage, a fuel burner at the passage entrance delivering fuel and air, and an air heater at the gas exit having spent gas conduits aligned with the direction of outflow of the spent gases and with entrance air flow passages in communication with the fuel burner directing the air through the heater continuously at right angles to the flow of spent gases.

18. The method of operating a vapor generator of the drumless forced flow type having a separator between the generating and superheating portions of the fluid flow path which includes, supplying liquid to fill the path prior to vapor generation and at a rate in excess of vapor outflow during generation, heating the path throughout its length, continuously diverting liquid from the separator until vapor forms consequent to the heating and a level is produced in the separator, and then regulating subsequent diversion from an indication of separator level, while the superheater vaporizes free of liquid.

19. The method of operating a vapor generator of the drumless forced flow type having a separator between the generating and superheating portions of the fluid flow path which includes, supplying liquid to fill the path prior to vapor generation and at a rate in excess of vapor outflow during generation, heating the path throughout its length, continuously diverting liquid from the separator until vapor forms consequent to the heating and a level is produced in the separator and then regulating subsequent diversion from an indication of separator level, and freeing the superheater of liquid.

ERVIN G. BAILEY.